(12) United States Patent
Strong et al.

(10) Patent No.: US 9,809,074 B2
(45) Date of Patent: Nov. 7, 2017

(54) TRAILING AXLE SUSPENSION SYSTEM

(71) Applicants:Brooks Strong, Houston, TX (US);
Joshua Cayne Fisher, Montgomery, TX (US)

(72) Inventors: Brooks Strong, Houston, TX (US);
Joshua Cayne Fisher, Montgomery, TX (US)

( * ) Notice: Subject to any disclaimer, the term of this patent is extended or adjusted under 35 U.S.C. 154(b) by 53 days.

(21) Appl. No.: 15/075,117

(22) Filed: Mar. 19, 2016

(65) Prior Publication Data
US 2017/0267043 A1 Sep. 21, 2017

(51) Int. Cl.
| | | |
|---|---|---|
| *B60G 11/28* | (2006.01) | |
| *B62D 61/12* | (2006.01) | |
| *B60G 9/02* | (2006.01) | |

(52) U.S. Cl.
CPC ............... *B60G 11/28* (2013.01); *B60G 9/02* (2013.01); *B62D 61/125* (2013.01); *B60G 2200/314* (2013.01); *B60G 2202/152* (2013.01); *B60G 2300/402* (2013.01)

(58) Field of Classification Search
CPC .... B60G 11/28; B60G 9/02; B60G 2200/314; B60G 2202/152; B60G 2300/402; B62D 61/125

See application file for complete search history.

(56) References Cited

U.S. PATENT DOCUMENTS

| | | | | |
|---|---|---|---|---|
| 4,063,779 A | * | 12/1977 | Martin | B62D 61/125 180/24.02 |
| 4,146,243 A | * | 3/1979 | Sims | B60S 9/10 180/24.02 |
| 5,823,629 A | * | 10/1998 | Smith | B60G 9/02 180/209 |
| 6,247,712 B1 | * | 6/2001 | Smith | B62D 61/12 180/209 |
| 6,315,311 B1 | * | 11/2001 | Mathiowetz | B62D 61/125 180/209 |

(Continued)

*Primary Examiner* — Darlene P Condra
(74) *Attorney, Agent, or Firm* — Ronald L. Phillips

(57) ABSTRACT

A trailing axle suspension system is disclosed comprising an auxiliary chassis, an axle suspension system suspending a trailing axle from the auxiliary chassis, and an auxiliary chassis system suspending the auxiliary chassis from the chassis of a motor vehicle. With the auxiliary chassis suspension system including a pair of suspension arms supporting the auxiliary chassis for pivotal movement and adapted to be pivotally connected to the motor vehicle chassis. And with the axle suspension system and auxiliary chassis suspension system adapted to cooperatively establish the auxiliary chassis and trailing axle in a stowed condition on the motor vehicle and establish the auxiliary chassis and trailing axle in a deployed condition at a location rearward of the motor vehicle chassis and then forcibly cause the auxiliary chassis to help support the motor vehicle chassis with the trailing axle. And wherein the auxiliary chassis suspension system includes a load-bearing member that is separate from the pivotal support of the auxiliary chassis rigidly joining the suspension arms and adapted to engage the auxiliary chassis in establishing the deployed condition and bear a major portion of the force causing the auxiliary chassis to help support the motor vehicle chassis with the trailing axle.

51 Claims, 21 Drawing Sheets

(56) References Cited

U.S. PATENT DOCUMENTS

| | | | |
|---|---|---|---|
| 6,371,227 B2 * | 4/2002 | Bartlett | B60G 17/0523 180/209 |
| 7,740,252 B2 * | 6/2010 | Strong | B62D 61/12 280/86.5 |
| 8,118,532 B2 * | 2/2012 | Phillips | B60L 11/18 414/435 |
| 8,485,538 B1 * | 7/2013 | Strong | B62D 61/12 180/209 |
| 8,523,203 B1 * | 9/2013 | Strong | B62D 61/12 180/24.02 |
| 2009/0206570 A1 * | 8/2009 | Strong | B62D 61/12 280/86.5 |
| 2017/0016757 A1 * | 1/2017 | Strong | G01G 19/08 |

* cited by examiner

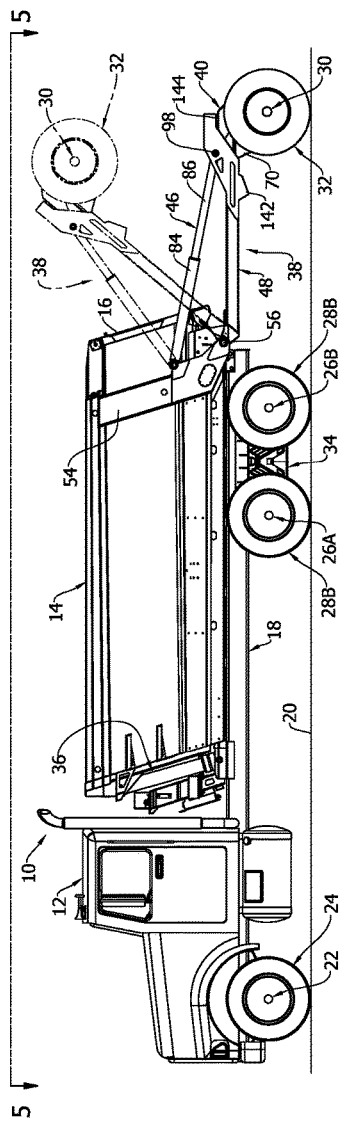

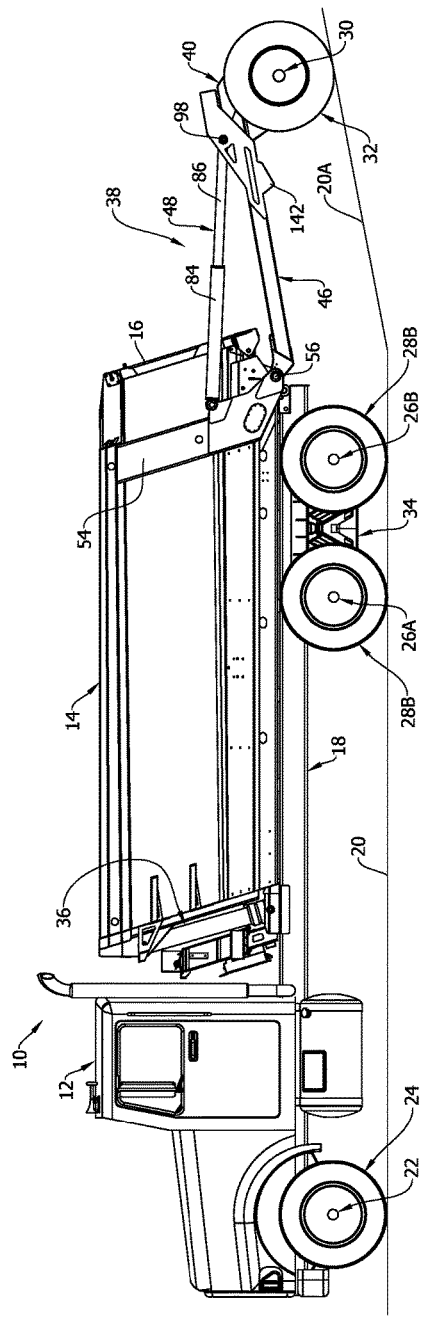
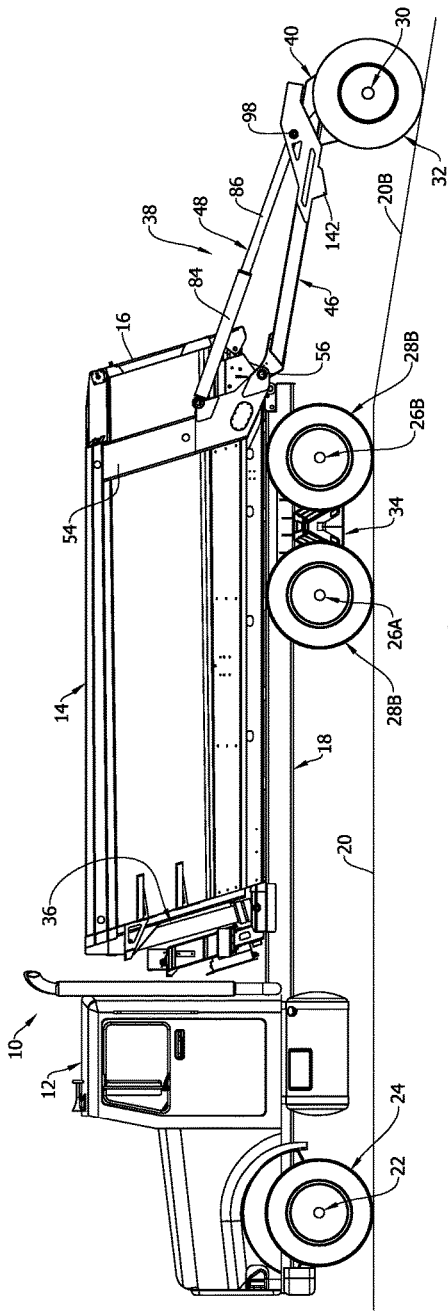

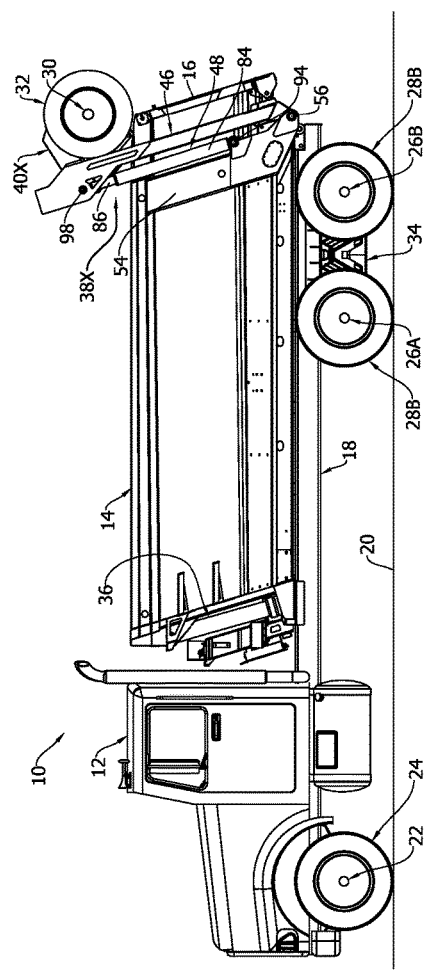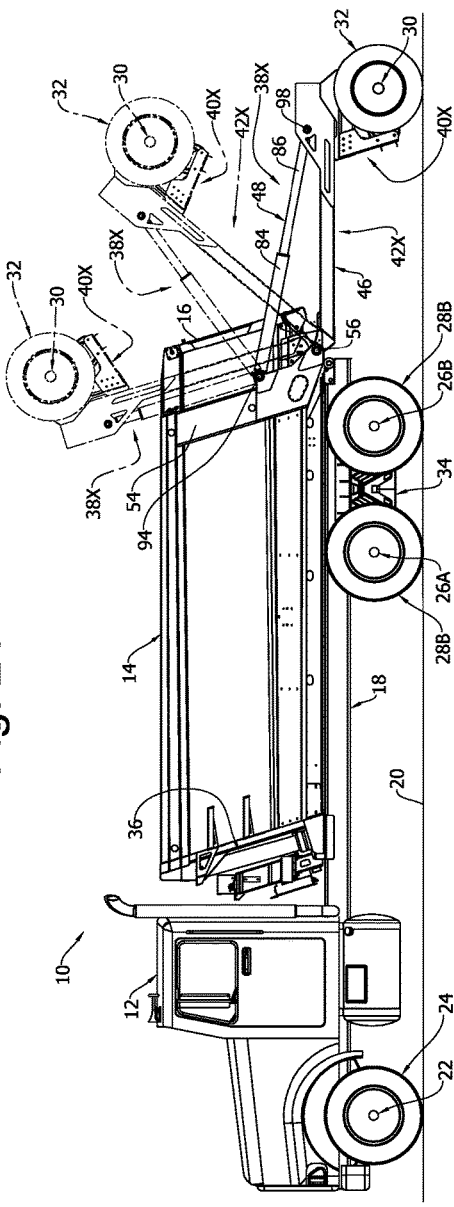

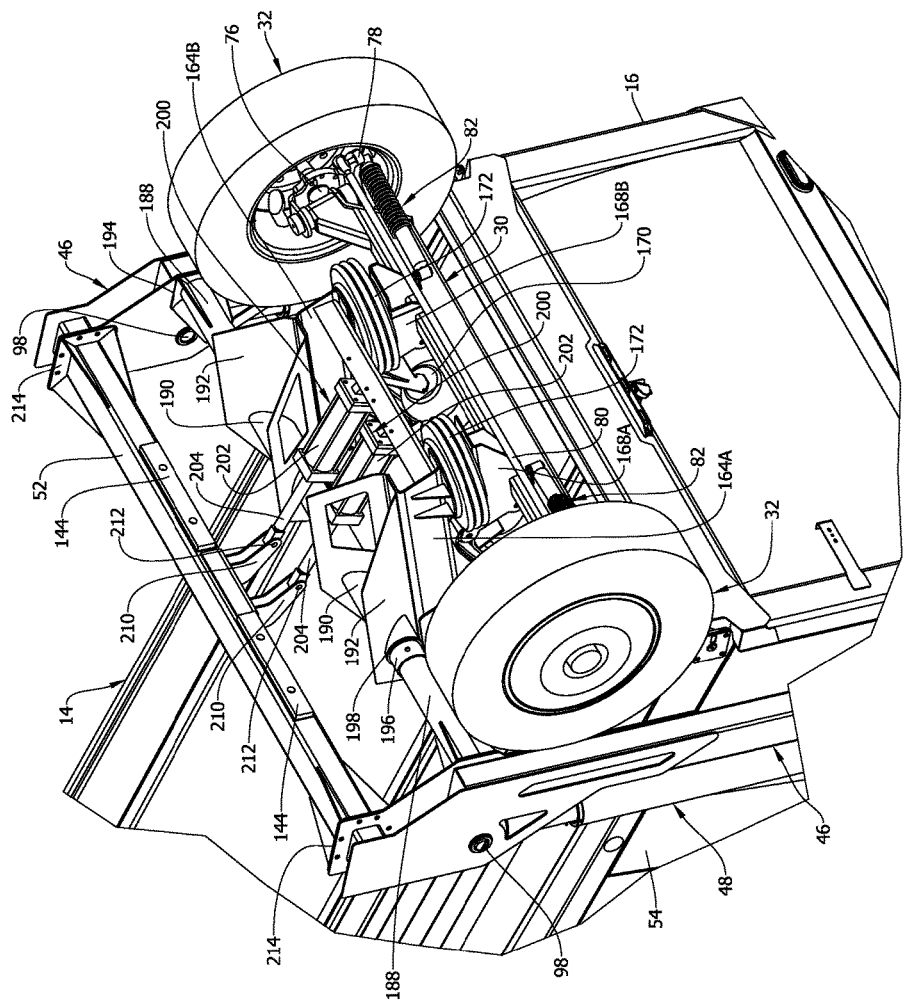

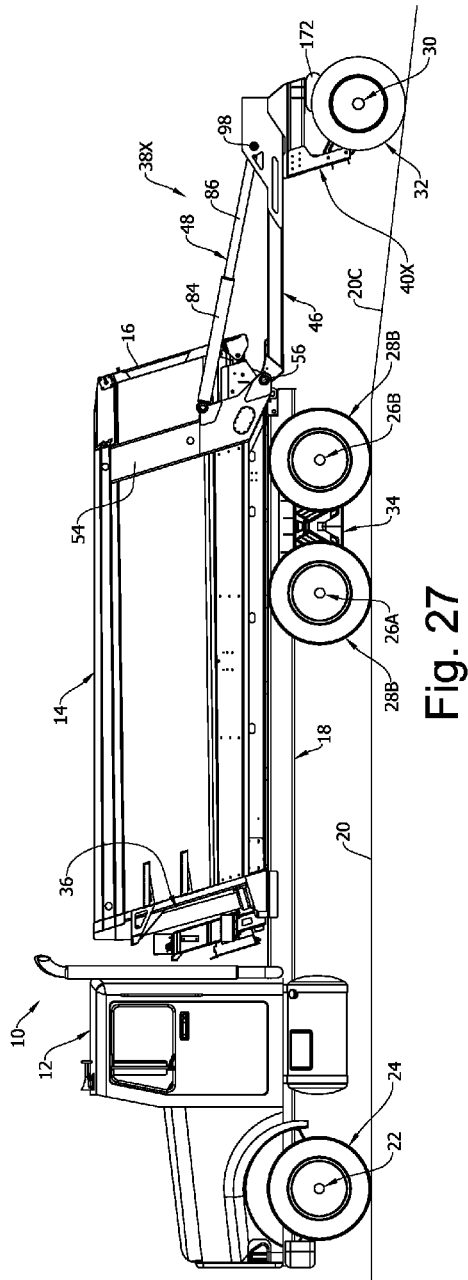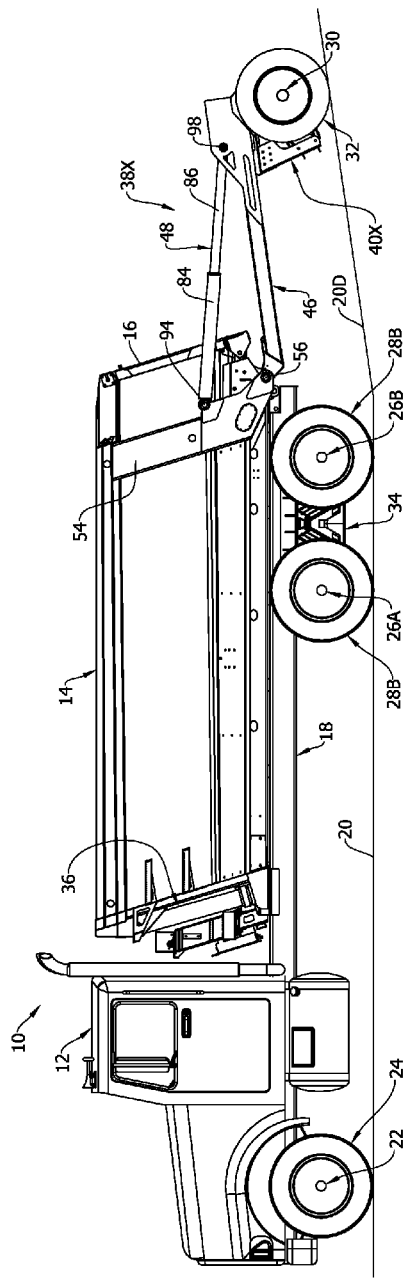

TRAILING AXLE SUSPENSION SYSTEM

TECHNICAL FIELD

This invention relates to auxiliary axle suspension systems for motor vehicles and more particularly to trailing axle suspension systems.

BACKGROUND OF THE INVENTION

Motor vehicles such as dump trucks, refuse trucks, transit concrete mixing trucks, open-bed trucks, utility trucks, military trucks and other vehicles of various types to which a significant load may be added for transport are limited in their load transporting ability by various factors. Such as the weight bearing capacity of their supporting axles and applicable federal and state law. With such laws for example limiting the gross vehicle weight to 80,000 pounds, the weight carried by a single axle to 20,000 pounds and there being an exception as to consecutive axles that limits them to carrying a prescribed combined weight depending on their number and spacing. For example, the combined axle carrying weight is limited to 34,000 pounds in regard to the two powered tandem axles that are typically employed with heavy-duty load-transporting motor vehicles. And with such factors as a result impacting the use of such motor vehicles in that the more weight the vehicle can transport at a time, the more useful the vehicle can be provided other factors that impact the ability of the vehicle to perform in an acceptable manner are also taken into account. With such factors including the axle manufacturers rated load capacity.

And in regard to such motor vehicles where it is desired to increase their load carrying capacity within the prescribed limits, it is common practice to provide one or more auxiliary axles that are deployed on command to help support the motor vehicle and thereby reduce the weight carried by the axles that normally support the vehicle. Wherein the axles that normally support the vehicle are then referred to as primary axles and include at least one axle with steerable wheels and one or more powered axles with wheels. And the auxiliary axles are referred to as either a pusher axle, tag axle or trailing axle in distinguishing between where and how they are employed to help support the motor vehicle. Wherein a pusher axle is suspended from the motor vehicle chassis in a location to operate between a forwardly-located primary axle with steerable wheels under the control of the vehicle operator and one or more rearwardly-located primary axles with powered wheels. Whereas a tag axle is suspended from the motor vehicle chassis to operate rearward of one or more primary axles with powered wheels but not normally at any substantial distance behind the motor vehicle chassis. And a trailing axle (that has also been referred to as a tag axle and trailing tag axle) is also suspended from the motor vehicle chassis but in a manner to operate at a substantial distance rearward of the motor vehicle chassis.

In the case of a motor vehicle equipped with a trailing axle, when not in use the trailing axle is typically stowed at a location near or above the highest point of the payload-carrying body, so as to not interfere with the normal operation of the latter. For example, a dump truck equipped with a trailing axle will typically stow the trailing axle above the rear of the dump body so that the payload can be dumped without interference from the trailing axle and its wheels. And to provide for such, the trailing axle suspension system is typically comprised of a pair of suspension arms that are pivotally attached to the motor vehicle chassis and are swung to establish the trailing axle in a stowed condition on the dump body and in a deployed condition to help support the truck chassis from behind with the trailing axle. And in addition to this trailing axle movement via the swing of the suspension arms, trailing axles will often require a secondary movement relative to these suspension arms to further stow the axle in a more acceptable or desirable location and compact manner. And again using a dump truck equipped with a trailing axle as an example, the trailing axle with its wheels will often exceed vehicle height restrictions when these suspension arms are swung to establish the trailing axle and its wheels in the stowed position and thus the trailing axle with its wheels often requires further movement relative to these suspension arms in order to comply with height restrictions and so that the dump body can be operated in the desired manner when the trailing axle is not being used.

Various approaches directed at providing a suitable trailing axle suspension system addressing the above needs are for example disclosed in U.S. Pat. No. 5,823,629, U.S. Pat. No. 6,247,712 and U.S. Pat. No. 7,775,308. And in these and other approaches that have addressed such needs, the trailing axle is typically supported for swinging movement relative to the suspension arms pivotally connected to the motor vehicle chassis by a cross-member rigidly joining the suspension arms and wherein an actuator operating between the trailing axle and this cross-member is employed to establish their angular relationship in both the stowed and deployed condition of the trailing axle. And when the trailing axle is deployed and forced to help support the motor vehicle chassis in the deployed condition, all of this force is transmitted through this cross-member to these suspension arms and thereby to the motor vehicle chassis. Moreover, this cross-member is also subjected to torque with the trailing axle in the deployed condition and this results in torsion stresses also being transmitted to this cross-member and being magnified and concentrated at the ends of this cross-member where it joins the suspension arms. And thus requires the cross-member being adequately structurally suited to the task and preferably without significantly adding to its weight. As the motor vehicles that benefit from a trailing axle are generally of the payload-carrying type and payload-carrying vehicles desire minimal vehicle weight in order to maximize the payloads they can carry and that includes the weight added with a trailing axle installation.

SUMMARY OF THE INVENTION

The present invention resides in a trailing axle suspension system wherein there is provided an auxiliary chassis, an axle suspension system that is adapted to suspend a trailing axle from the auxiliary chassis, and an auxiliary chassis system that is adapted to suspend the auxiliary chassis from the chassis of a motor vehicle. With the auxiliary chassis suspension system including a pair of suspension arms supporting the auxiliary chassis for pivotal movement and adapted to be pivotally connected to the motor vehicle chassis. And with the axle suspension system and auxiliary chassis suspension system adapted to cooperatively (a) establish the auxiliary chassis and thereby the trailing axle in a stowed condition on the motor vehicle and (b) establish the auxiliary chassis and thereby the trailing axle in a deployed condition at a location rearward of the motor vehicle chassis and then forcibly cause the auxiliary chassis to help support the motor vehicle chassis with the trailing axle. And instead of relying on structure rigidly joining the suspension arms to support the auxiliary chassis and also transmit force to the auxiliary chassis in forcing the trailing axle to help support the motor vehicle chassis, the auxiliary chassis suspension system employs a load-bearing member that is separate from the pivotal support of the auxiliary chassis and (a) rigidly joins the suspension arms and (b) is adapted to engage the auxiliary chassis in establishing the deployed condition and thereby bear a major portion of the force causing the auxiliary chassis to help support the motor vehicle chassis with the trailing axle. And with the load-bearing member also adapted to establishing the trailing axle in a non-interfering condition with regard to the operation of certain motor vehicle load containers such as dump bodies that are tilted to dump a load.

And these and other features and aspects of the invention are disclosed in the accompanying drawings and description of several exemplary embodiments.

DESCRIPTION OF THE DRAWINGS

FIG. 3 is a side view of the dump truck wherein the trailing axle is shown in phantom lines while being deployed from its stowed condition and then established in its deployed condition as shown in solid lines.

FIG. 4 is a side view of the dump truck with the trailing axle in its stowed condition on the dump body of the truck and with the dump body tilted and the tailgate of the dump body open for dumping a load.

FIGS. 16 and 17 are side views of the dump truck with the trailing axle deployed and while the trailing axle is traveling on sections of a road surfaces at elevations different from that being traveled by the primary axles supporting the dump truck.

FIG. 21 is a side view of the dump truck employing the embodiment of the trailing axle suspension system in FIGS. 19 and 20 wherein the trailing axle is shown in its stowed condition.

FIG. 22 is a side view of the dump truck employing the embodiment of the trailing axle suspension system in FIGS. 19 and 20 wherein the trailing axle is shown in phantom lines while being deployed from its stowed condition and then established in its deployed condition shown in solid lines.

FIG. 23 is a perspective view of a portion of the embodiment of the trailing axle suspension system in FIGS. 19 and 20 with the trailing axle in its stowed condition on the dump body.

FIGS. 27 and 28 are side views of the dump truck employing the trailing axle suspension system in FIGS. 19-26 with the trailing axle deployed and while the trailing axle is traveling on sections of a road surfaces at elevations different from that being traveled by the dump truck's primary axles.

DESCRIPTION OF EXEMPLARY EMBODIMENTS

Figure 1:
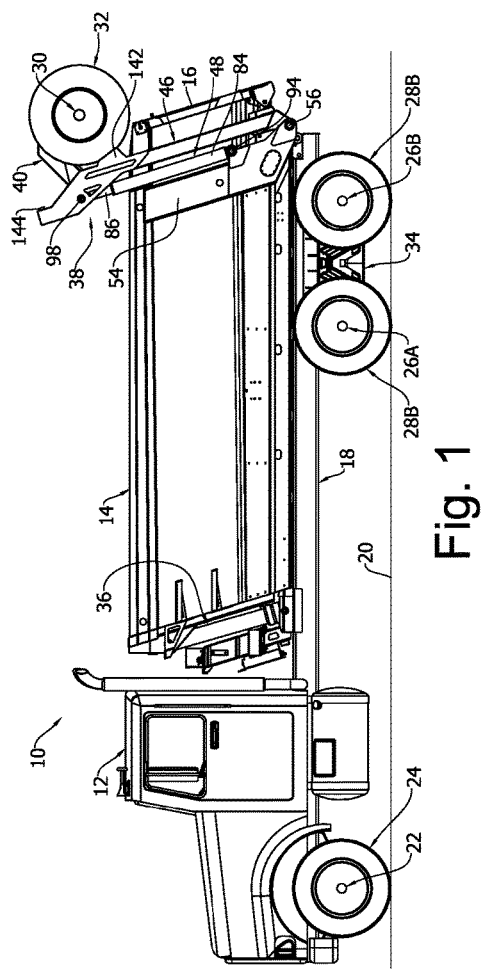
FIG. 1 is a side view of a dump truck employing an exemplary embodiment of the trailing axle suspension system according to the present invention wherein the trailing axle is shown in its stowed condition.

Referring to FIGS. 1-17, the present invention is shown as employed by a dedicated load-carrying motor vehicle in the form of a dump truck 10 having a cab 12 that serves as a vehicle operator and passenger compartment and a tiltable dump body 14 that serves as a load container and has a latchable top-hinged tail gate 16 for releasing a load when the dump body is tilted. With the cab 12 and tiltable dump body 14 mounted on a chassis 18 in a conventional manner, and the truck chassis in turn supported on a road surface 20 by primary axles and a deployable auxiliary axle that is available on demand to help support the truck chassis. With the primary axles consisting of a forwardly-located front axle 22 with steerable wheels 24 at its outboard ends under the control of the vehicle operator and rearwardly-located powered tandem axles 26A and 26B with dual wheels 28A and 28B respectively at their outboard ends. And with the auxiliary axle being a trailing axle 30 with wheels 32 at its outboard ends. And all of the wheels include a pneumatic tire as shown.

And wherein the front axle 22 and powered tandem axles 26A and 26B are suspended in parallel relationship from laterally spaced locations on the truck chassis 18. With the front axle 22 located under a front end portion of the truck chassis and the powered tandem axles 26A and 26B located under a rear end portion of the truck chassis and dump body 14. And with the tandem axles 26A and 26B and thus their wheels 28A and 28B powered by a power train of a suitable conventional type that includes an engine and transmission (not shown) that are controlled from the cab by the vehicle operator. And wherein the suspension systems suspending the primary axles from the truck chassis 18 are of a conventional type and of which only a portion of the tandem axles' suspension system 34 is shown and is of the rocking-beam type. See FIGS. 1-4. And a pneumatically-operated lift mechanism 36 mounted between the truck chassis 18 and the dump body 14 at the forward end of the latter is operable to tilt the dump body as shown in FIG. 4 to dump a load.

Turning now to the trailing axle 30, it is suspended from the dump body 14 and thereby from the truck chassis 18 by a trailing axle suspension system 38 according to the present invention. Wherein the trailing axle suspension system 38 comprises an auxiliary chassis 40 that is suspended from the truck chassis 18 by an auxiliary chassis suspension system 42 and the trailing axle 30 is suspended from the auxiliary chassis 40 by an axle suspension system 44.

Describing now the auxiliary chassis suspension system 42 that suspends the auxiliary chassis 40 from the truck chassis 18, it comprises a pair of parallel-arranged suspension arms 46, a pair of parallel-arranged hydraulically-operated actuators 48, a cross-member 50 that rigidly joins the suspension arms 46 and provides for support of the auxiliary chassis with the suspension arms 46, and a cross-member 52 that also rigidly joins the auxiliary chassis suspension arms. Wherein the suspension arms 46 and hydraulically-operated actuators 48 are located to clear the outer sides of the dump body 14 and are connected with the dump body 14 and thereby with the truck chassis 18 in a reinforced manner by parallel-arranged suspension-support members 54 that are rigidly joined to the outer side of a rear end-portion of the dump body 14. And wherein the suspension arms 46 are pivotally connected at one end by axially aligned pivot pins 56 to a lower end portion of the respective suspension-support members 54 to swing about an axis parallel to the truck's primary axles 22, 26A and 26B and the auxiliary chassis 40 is pivotally supported by the suspension arms with the cross-member 50 at a location between the cross-members 50 and 52 for swinging movement about an axis also parallel with the truck's primary axles. With the pivotal support of the auxiliary chassis 40 by the suspension arms 46 provided by axially-aligned pivot pins 58 having an interference-fit with axially-aligned tubular members 60 that are fixed to framework members 62 of the auxiliary chassis 40.

And in completing the pivotal support of the auxiliary chassis 40 by the suspension arms 46, the pivot pins 58 thus fixed to the auxiliary-chassis are received by axially-aligned bearings 64 that are of the self-lubricating type and mounted with trussed hangers 66 on the cross-member 50 that is welded at its ends to the auxiliary chassis suspension arms 46 at a location between their ends in rigidly joining the suspension arms 46. And wherein the pivot axis provided for the auxiliary chassis 40 by the pivot pins 58 is located parallel to the axis about which the auxiliary chassis suspension arms 46 can swing and thus parallel to the to the truck's primary axles 22, 26A and 26B and thereby locates the trailing axle 30 parallel with the truck's primary axles and maintains this condition when the auxiliary chassis 40 is swung relative to the auxiliary chassis suspension arms 46 as further described later.

And turning now to the cross-member 52, it is welded at its ends to the rearward end of the auxiliary chassis suspension arms 46 in rigidly joining the suspension arms 46 and locating the cross-member 52 parallel to that of the auxiliary chassis suspension arms' pivot pins 56 and the hydraulically-operated actuators' pivot pins 94 and 98. And wherein the cross-member 52 unlike the cross-member 50 that also rigidly joins the suspension arms 46 plays no part in supporting the auxiliary chassis 40 for pivotal movement and instead serves as a principal load-bearing member in the trailing axle suspension system 38 in transmitting the force that forces the auxiliary chassis to help support the truck chassis 18 with the trailing axle 30 as further described later.

Describing now the axle suspension system 44 that suspends the trailing axle 30 from the auxiliary chassis 40, the trailing axle 30 is pivotally connected to the auxiliary chassis 40 with a pivot pin 68 for swinging movement about a pivot axis that is midway of and perpendicular to the trailing axle and is located above the trailing axle when deployed in helping to support the truck chassis 18. With this pivotal connection being provided by the trailing axle 30 having a centrally-located and rigidly-joined extension 70 at its upper side and the auxiliary chassis 40 having a structural frame member 72 that straddles the trailing axle extension 70 and together therewith receives the pivot pin 68 to complete the pivotal connection of the trailing axle 30 to the auxiliary chassis 40. And with the trailing axle pivot pin 68 oriented such that the trailing axle's pivotal axis is perpendicular to the auxiliary chassis pivot axis at all times and is substantially parallel to the road surface 20 when the trailing axle 30 is in its deployed condition in helping to support the truck chassis. And with the trailing axle 30 in its deployed condition, pivotal movement of the trailing axle relative to the auxiliary chassis 40 and thus the suspension arms 46 and the truck chassis 18 supporting the dump body 14 is permitted to a limited extent by the allowable compression and extension of matching air springs 74 of elastomeric bag construction. That are located in pairs on opposite sides of the trailing axle pivot pin 68, mounted to operate between the trailing axle 30 and the auxiliary chassis 40, and filled with air at a certain pressure to provide spring action suited to the intended use in cushioning road-induced trailing axle pivotal movement about the pivot pin 68.

And like that in U.S. Pat. No. 7,775,308, the allowed pivotal movement of the trailing axle 30 about the axis of the pivot pin 68 together with the air springs 74 applies a net torque on the trailing axle 30 about this axis when the trailing axle is not parallel to the pivot axis of the auxiliary chassis 40 that acts in the opposite direction of such trailing axle pivotal movement and increases in proportion to the increase in the pivotal movement of the trailing axle relative to the pivot axis of the auxiliary chassis. And thus the air springs 74 with the trailing axle 30 deployed aid the primary axle suspension systems in minimizing tilting of the dump body 14 relative to the road surface 20 when the dump truck 10 encounters lateral forces urging tilting of the truck chassis 18 about its roll axis such as when the truck travels through turns, encounters cross winds and during certain loading while stationary. See FIG. 15.

Continuing on with the trailing axle 30, the trailing axle wheels 32 are mounted on the ends of the trailing axle 30 with a steering knuckle 76 that establishes the wheels with a suitable positive caster angle and has a steering arm 78 wherein the steering arms 78 and thereby the trailing axle wheels 32 are connected by a tie rod 80 that also provide the wheels with a suitable toe-in And wherein the thus connected trailing axle wheels are stabilized and returned to a normal condition by coil-spring, shock-absorber assemblies 82 like that in U.S. Pat. No. 7,775,308 following forced steerage in reaction to the steered turning movement of the truck. Whereby the trailing axle wheels 32 with the trailing axle 30 deployed in its active condition is enabled to align with forward and rearward truck movement as shown in solid lines in FIG. 5 and self-steer in the direction of forward and reverse turning movement of the truck as shown in phantom lines in FIG. 5.

Turning now to the hydraulically-operated actuators 48, they are like those in U.S. Pat. No. 7,775,308 wherein they comprise a cylinder 84 slidably receiving a piston 86 and incorporate a gas spring 88. With the gas springs 88 each comprising a piston 90 that is slidably received in the related actuator piston 86 and is acted on at one end by the hydraulic pressure acting on the actuator piston and is acted on at the other end by gas pressure at a prescribed charge pressure that is made available in adequate supply to both gas springs 88 by a gas pressure accumulator tank 92 located in the cross-member 52. See FIG. 13. And with the gas for example being nitrogen for system compatibility and the charge pressure determined for the intended gas spring operation described later.

Continuing on with the employment of the hydraulically-operated actuators 48, their respective cylinders 84 are pivotally connected at their closed end by axially-aligned pivot pins 94 to the respective support members 54 at a location above the pivotal connection of the auxiliary chassis suspension arms 46 with these support members. And the actuator pistons 86 are pivotally connected at their operating end within and to a channel portion 96 of the respective suspension arms 46 by axially-aligned pivot pins 98 at a relatively short distance from where the auxiliary chassis suspension arms 46 are joined by the cross-member 50 that provides for the pivotal support of the auxiliary chassis 40 with the suspension arms as further described later. Whereby the hydraulically-operated actuators 48 on retracting swing the auxiliary chassis suspension arms 46 about the axis of the aligned pivot pins 56 in a counter-clockwise direction as viewed in FIG. 1 and on extending swing the suspension arms 46 about these pivot pins in the clockwise direction.

Referring again to FIG. 13, the operation of the hydraulically-operated actuators 48 is provided by a hydraulic circuit 100 comprising a vented liquid tank (LT) 102 containing hydraulic fluid, a hydraulic pump (P) 104 that is supplied with the hydraulic fluid in the tank 102 and operates on demand to deliver the hydraulic fluid to a manifold (M) 106, a controllable hydraulic pressure regulator valve (RV) 108 that returns excess hydraulic fluid at the manifold to the tank in regulating the pressure being supplied for actuator operation, a pressure sensor (PS) 110 that provides feedback for controlling the operation of the pressure regulator valve (RV) 108 in providing the desired operating pressure for the actuators 48, an axle-stowing valve (SV) 112 and exhaust valve (EV) 114 providing for actuator retraction, and an axle-deploying valve (DV) 116 and exhaust valve (EV) 118 providing for actuator extension. And wherein the valves in the hydraulic circuit 100 are of a conventional electrically-operated type with the pressure regulator valve (RV) 108 being operable to vary the hydraulic pressure supplied to the actuators 48 in accordance with a controlled voltage input. And wherein the components in the hydraulic circuit 100 are interconnected as shown and controlled with a master control valve center (MCVC) 120 that operates these valves under the command of the vehicle operator from a central command module (CCM) 122 located in the cab 12.

Describing now the pivotal positioning of the auxiliary chassis 40 and thereby the trailing axle 30 with respect to the supporting suspension arms 46, a pneumatically-operated actuator 124 is provided for that purpose in the auxiliary chassis suspension system 42. With the actuator 124 being revealed in FIG. 6 wherein a top cover member 126 that is integral with the auxiliary chassis framework has been removed and also in the exploded view in FIG. 8 wherein both the top cover member and a removable bottom cover member 128 that provides access for servicing are shown separate from the auxiliary chassis.

And now describing the pneumatically-operated actuator 124 and its installation, the actuator comprises a cylinder 130 having a piston-operated rod 132. Wherein the cylinder 130 is pivotally connected at its closed end to the framework member 72 of the auxiliary chassis 40 with a bracket 134 and pivot pin 136 and the piston-operated rod 132 is pivotally connected at its operating end with a bracket 138 and pivot pin 140 to the cross-member 52 rigidly joining the suspension arms 46. Whereby the auxiliary chassis 40 and thereby the trailing axle 30 on full extension of the pneumatically-operated actuator 124 are swung about the axially-aligned pivot pins 58 in the clock-wise direction as viewed in FIG. 1 in establishing their stowed condition with full retraction of the hydraulically-operated actuators 48 as shown in this view. And wherein the tires of the trailing axle wheels 32 are pressed against a projecting angled portion 142 of the suspension arms 46 located on their bottom side to thereby firmly hold the trailing axle 30 and thereby the auxiliary chassis 40 in their stowed condition and thus minimize their exposure to structural stress attributed to vibrations or jarring forces that can occur when the vehicle is in motion. Moreover, the overall height of the truck is minimized with respect to the auxiliary chassis 40 and trailing axle 30 in that they have both been located downward to a significant extent in establishing the stowed condition shown in FIG. 1. Which can been seen by comparing FIG. 1 with FIGS. 2 and 4 showing the auxiliary chassis 40 engaging the cross-member 52 to position the trailing axle wheels 32 clear of operation of the tail gate 16.

Figure 2:
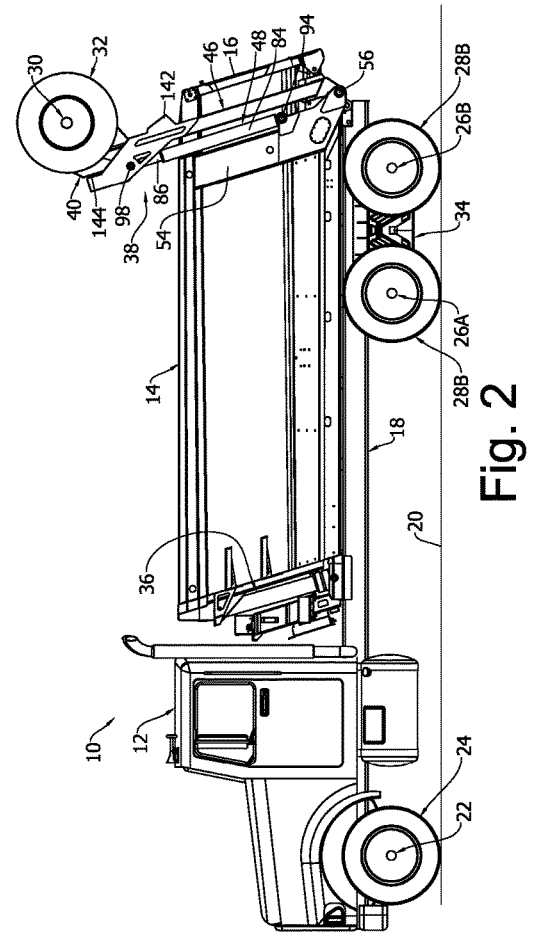
FIG. 2 is a side view of the dump truck wherein the trailing axle is shown positioned for dumping a load from the truck's dump body or deploying to help support the dump truck.
Figure 5:
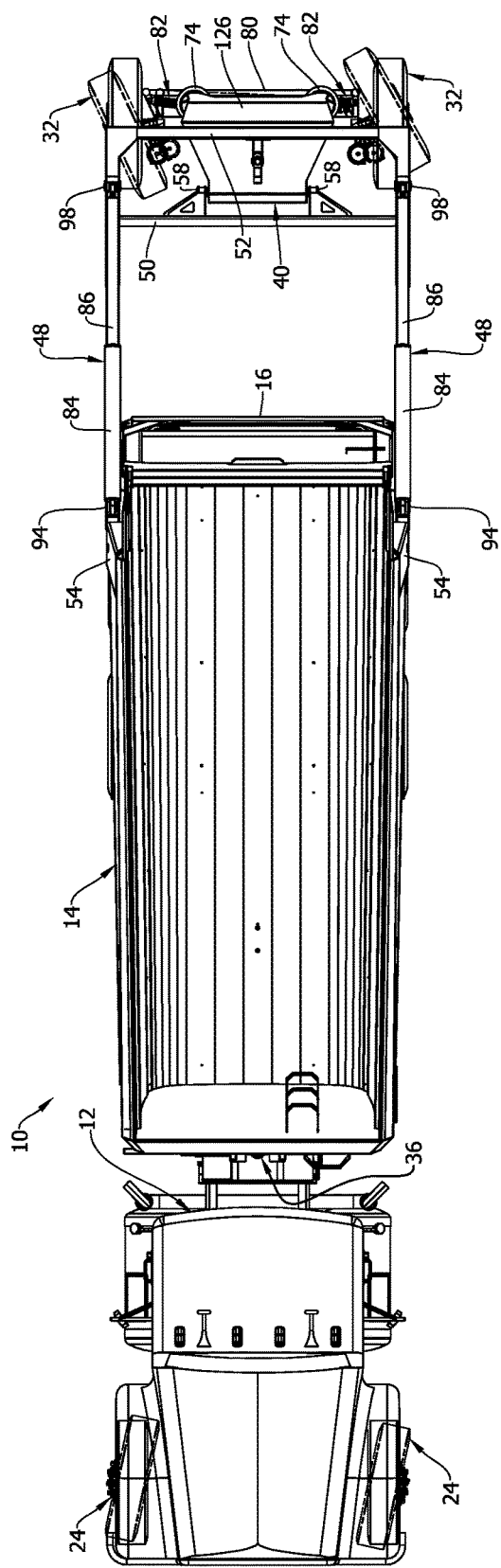
FIG. 5 is view taken along the lines 5-5 in FIG. 3 when looking in the direction of the arrows.
Figure 6:
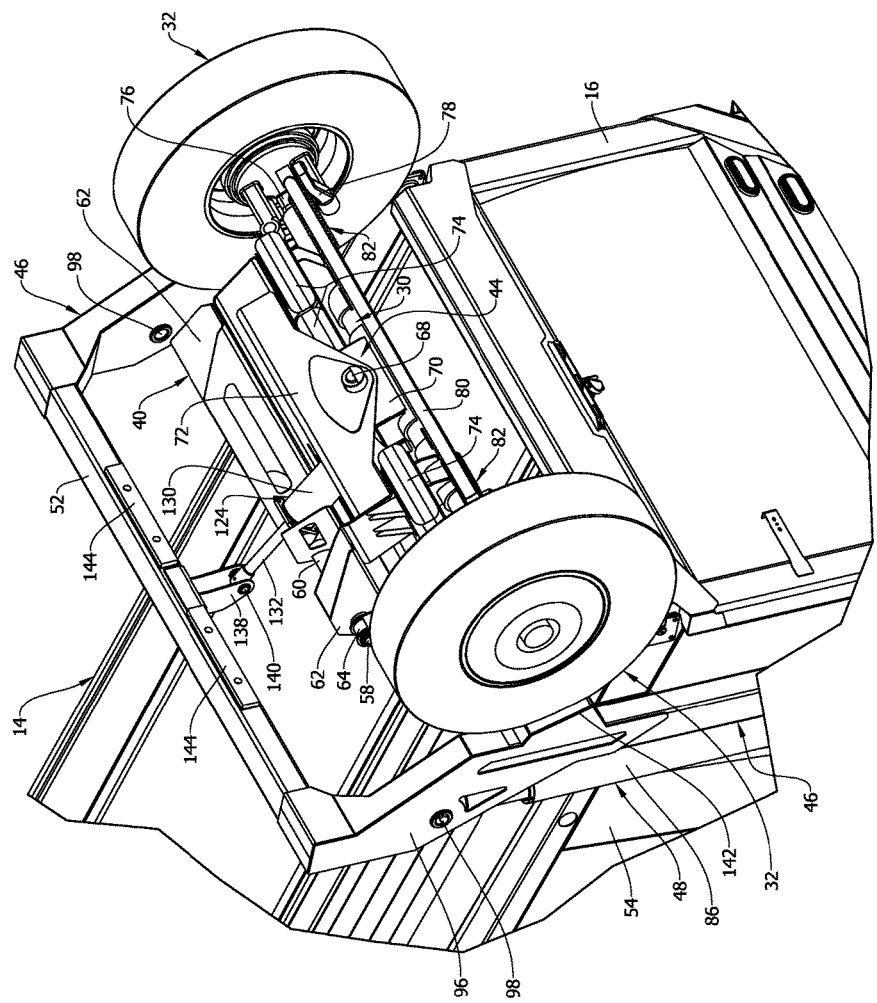
FIG. 6 is a perspective view of a portion of the trailing axle suspension system with the trailing axle in its stowed condition on the dump body.
Figure 7:
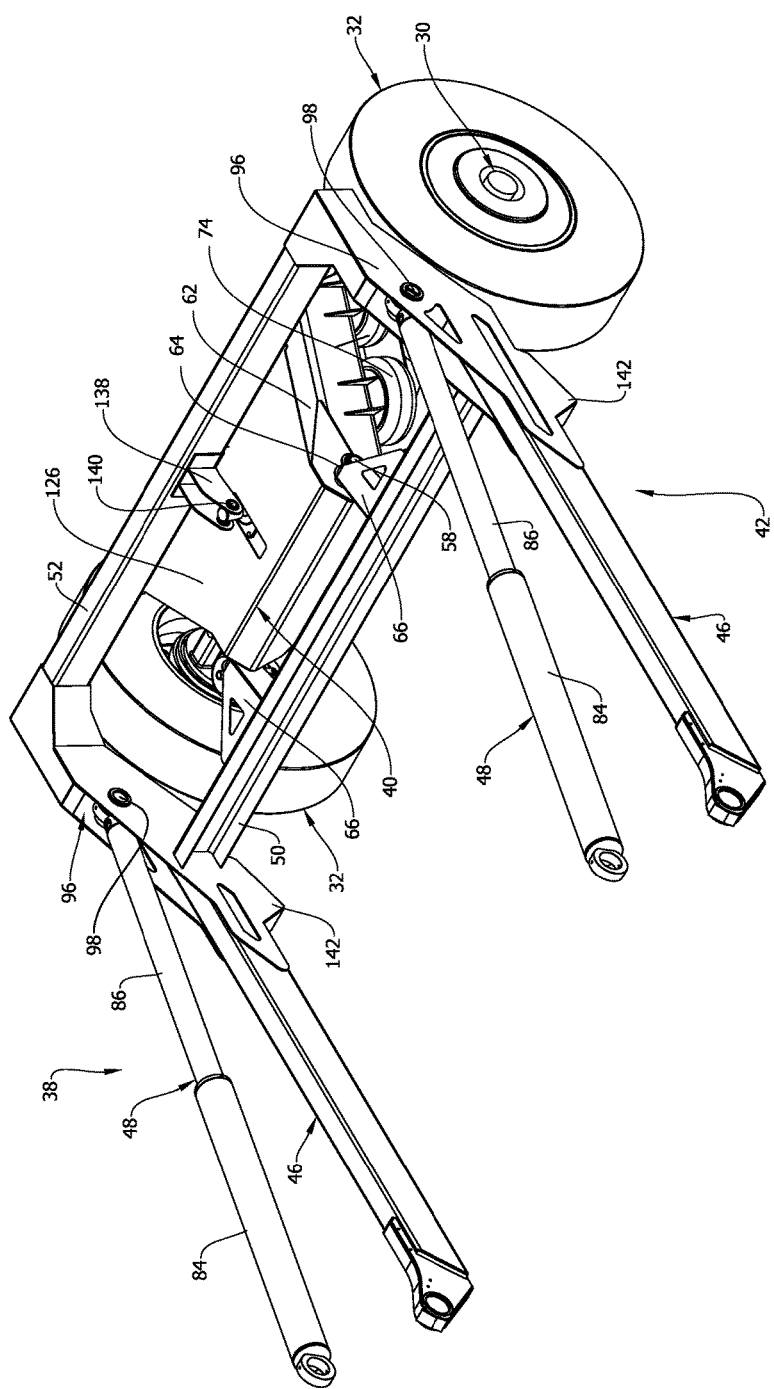
FIG. 7 is a perspective view of the trailing axle suspension system.
Figure 8:
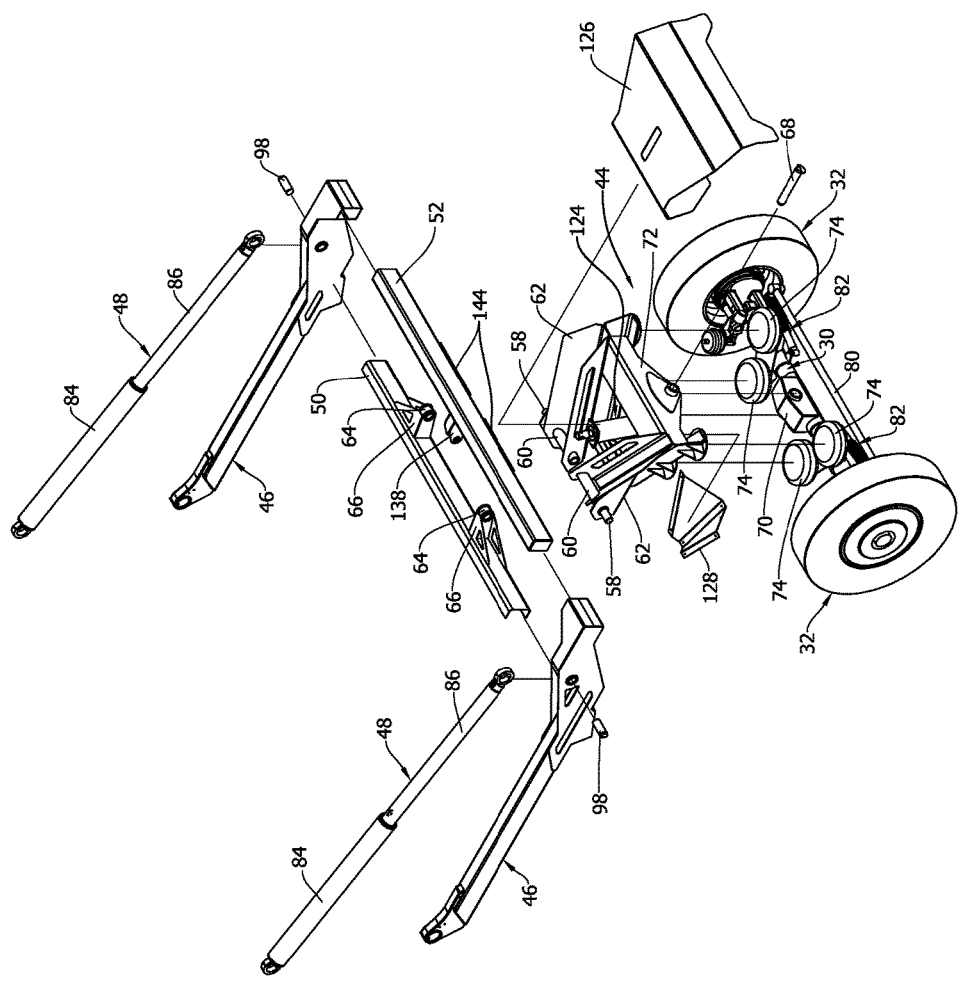
FIG. 8 is a partially-exploded perspective view of the trailing axle suspension system.
Figure 9:
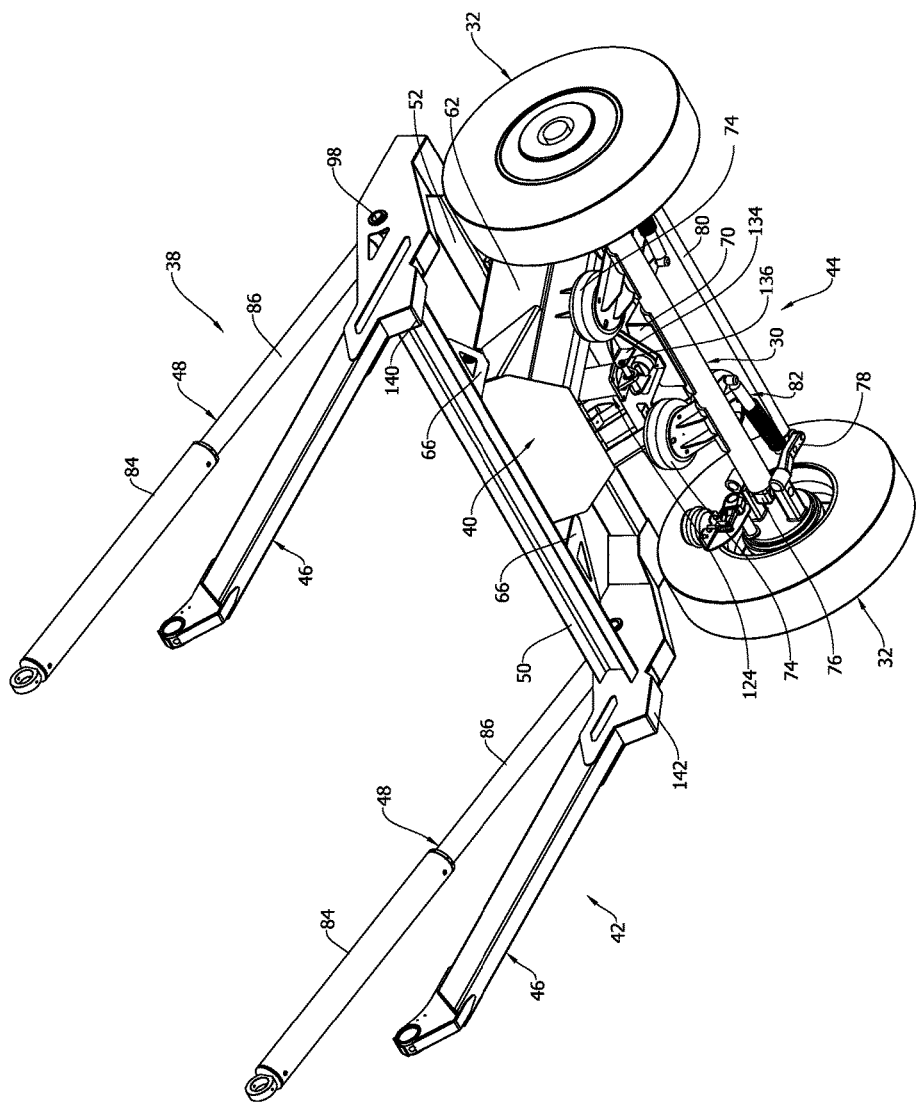
FIG. 9 is a perspective view of the underside of the trailing axle suspension system.
Figure 10:
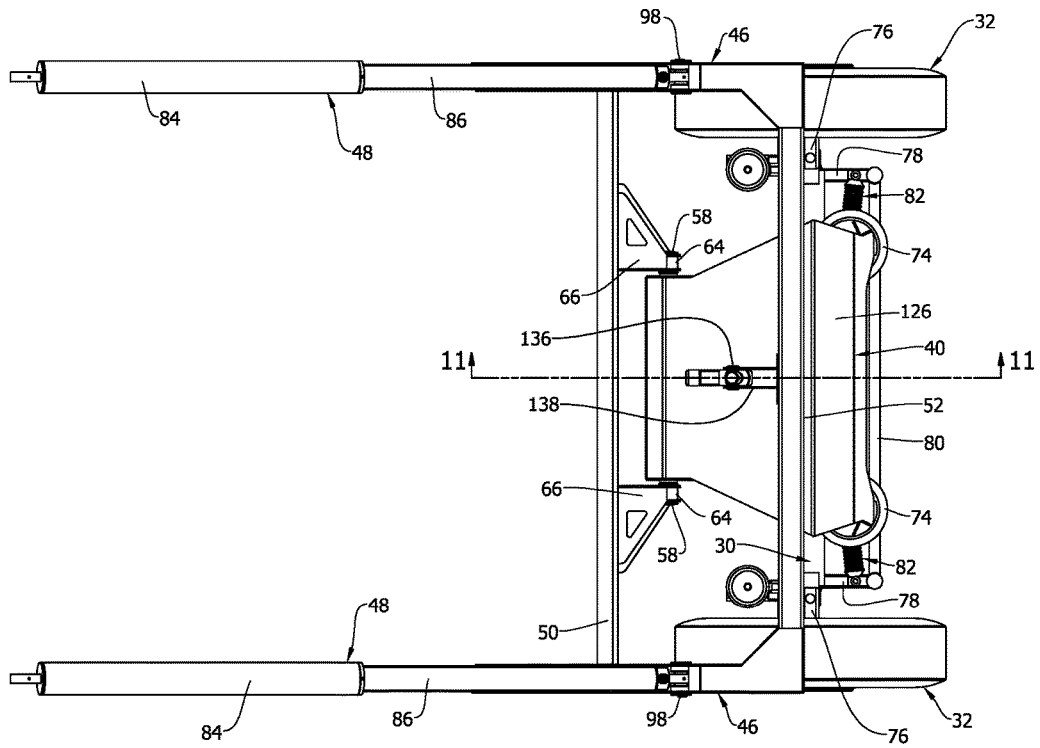
FIG. 10 is an enlarged overhead view of the trailing axle suspension system.

Continuing on, the auxiliary chassis 40 and thereby the trailing axle 30 on retraction of the pneumatically-operated actuator 124 are swung about the axially-aligned pivot pins 58 in the counter-clockwise direction as viewed in FIGS. 2-4 but only for limited pivotal movement of the auxiliary chassis 40 determined by engagement of the top cover 126 of the auxiliary chassis 40 with the cross-member 52 rigidly joining the auxiliary chassis suspension arms 46. And wherein the cross-member 52 for such engagement is provided with a pair of spaced pads 144 of elastomeric material such as rubber that are fixed to the bottom side of the cross-member 52 and directly engaged by the top cover 126 of the auxiliary chassis 40 and thus at spaced locations in limiting the pivotal movement of the auxiliary chassis 40 relative to the auxiliary chassis suspension arms 46. And wherein the elastomeric pads 144 with this engagement provide both structural compliance and shock absorbing action between the cross-member 52 and auxiliary chassis 40 in transmitting force there-between when the tires of the trailing axle wheels 32 are forced against a road surface in helping to support the truck chassis 18 in an advantageous manner as further described later.

Figure 14:
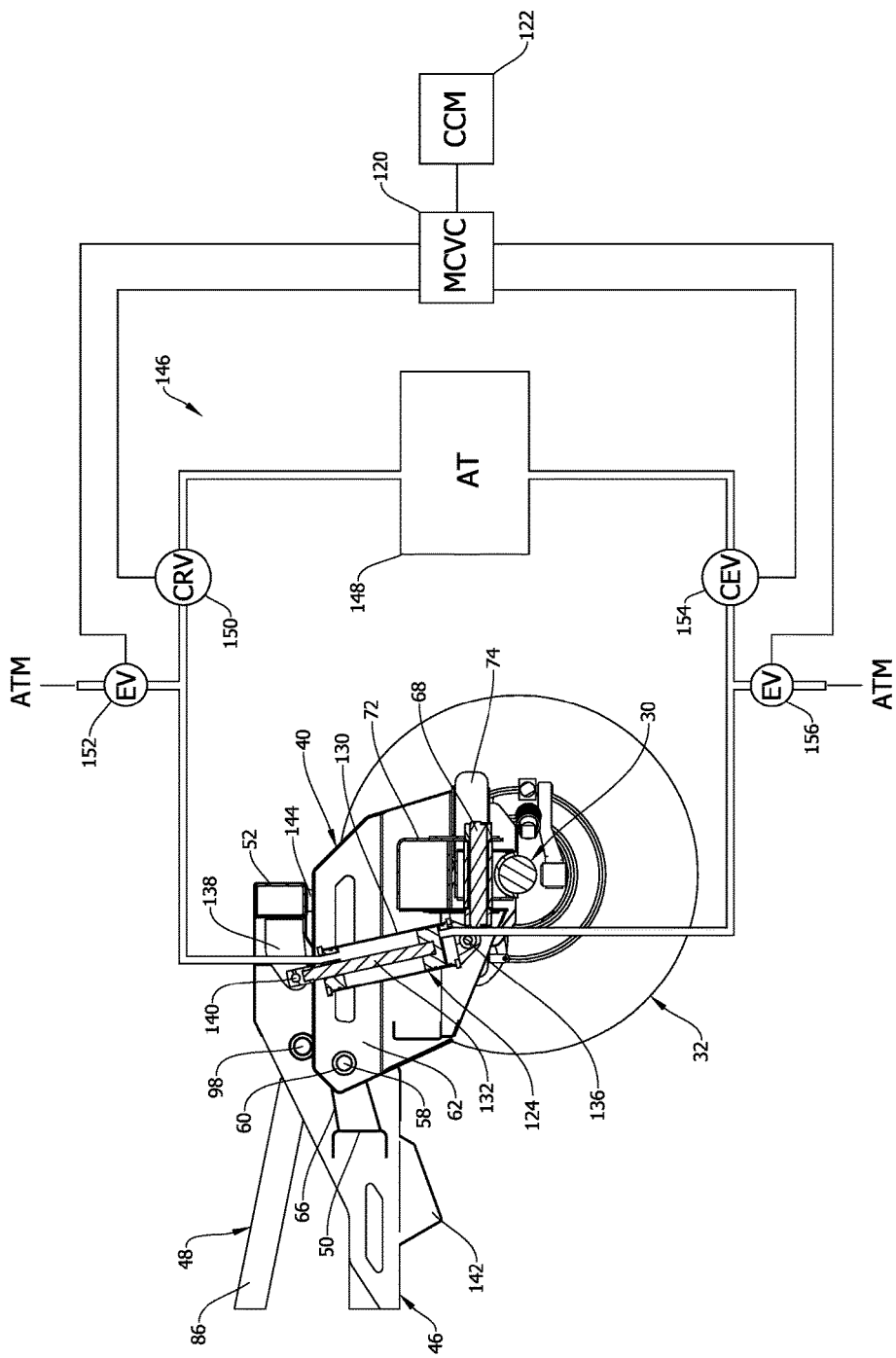
FIG. 14 is a schematic of the control system that controls the axle suspension system portion of the trailing axle suspension system.

Referring to FIG. 14, the operation of the pneumatically-operated actuator 124 is controlled by a pneumatic circuit 146 that is supplied by an air tank (AT) 148. And wherein air is supplied to the air tank (AT) 148 according to demand by an engine-driven air compressor (not shown) and maintained at a regulated pressure in a conventional manner suited to meet the needs of the trailing axle suspension system as well as other pneumatically-operated vehicle components such as air brakes. And for the operation of the pneumatically-operated actuator 124, there is provided a chassis-retracting valve (CRV) 150, an exhaust valve (EV) 152, a chassis-extending valve (CEV) 154, and an exhaust valve (EV) 156. Wherein the above valves are of a conventional electronically-operated type with the exhaust valve (EV) 152 when opened exhausting the air pressure downstream of the chassis-retracting valve (CRV) 150 to the atmosphere (ATM) and the exhaust valve (EV) 156 when opened exhausting the air pressure downstream of the chassis-extending valve (CEV) 154 to the atmosphere (ATM). And wherein the components in the pneumatic circuit 146 are interconnected as shown and controlled with the master control valve center (MCVC) 120 under the command of the vehicle operator from the central command module (CCM) 122 located in the cab 12.

Describing now a typical sequence of vehicle operator directed operation of the trailing axle suspension system 38 via the CCM 122 and MCVC 120 and starting with establishing the trailing axle 30 in the stowed condition shown in FIG. 1, this condition can be established at any time with the hydraulic circuit 100 and pneumatic circuit 146. Such as for example when the hydraulically-operated actuators 48 are fully extended and the pneumatically-operated actuator 124 is fully retracted such that the top cover 126 of the auxiliary chassis 40 is pressed firmly against the elastomeric pads 144 on the cross-member 52 as shown in solid lines in FIG. 3 in fully deploying and forcing the trailing axle 30 to help supporting the truck chassis. At which time the auxiliary chassis suspension arms 46 and thereby the auxiliary chassis 40 can be raised with the hydraulically-operated actuators 48 by the hydraulic circuit 100 by (A) opening stowing valve (SV) 112 and closing exhaust (EV) valve 114, (B) closing deploying valve (DV) 116 and opening exhaust valve (EV) 118, and (C) setting the actuator operating hydraulic pressure to a prescribed pressure with the pressure regulator valve (RV) 108 that results in the actuators 48 then retracting but only to the extent shown in FIGS. 1 and 2 for the purpose of stowing the auxiliary chassis and trailing axle. And wherein the auxiliary chassis 40 during the raising thereof effected by the actuators 48 as the latter retract to the prescribed limited extent is maintained in its deployed condition with respect to the auxiliary chassis suspension arms 46 by the pneumatically-operated actuator 124 remaining in its fully retracted condition.

Whereby the hydraulic actuators 48 on such limited hydraulic actuator retraction locate the auxiliary chassis suspension arms 46 in a substantially upright condition and the trailing axle chassis 40 and trailing axle 30 above the dump body 14 with the pneumatically-operated actuator 124 remaining in the fully retracted condition as shown in FIG. 2. Following the above operations and with the suspension arms 46 then located in their stowing position as shown in FIG. 2, the trailing axle 30 is then stowed in a tucked compact manner by the pneumatic circuit 146 by (A) opening the chassis-extending valve (CEV) 154 and exhaust valve (EV) 156, and (B) closing the chassis-retracting valve (CRV) 150 and exhaust valve (EV) 152 serving the pneumatically-operated actuator 124. Whereby the pneumatically-operated actuator 124 is extended to pivot the auxiliary chassis 40 in the clockwise direction about the axis of pivot pins 58 from the position in FIG. 2 and establish the trailing axle in the fully stowed condition shown in FIG. 1. Wherein the tires of the trailing axle wheels 32 are pressed firmly against the angled portion 142 of the suspension arms 46 with the full extension of the pneumatically-operated actuator 124 and the trailing axle 30 thereby firmly stowed with its height minimized for transit when the dump body 14 is empty and the trailing axle is not needed to aid in supporting the vehicle's weight.

Continuing with the operation of the trailing axle suspension system 38 via the CCM 122 and MCVC 120, with the auxiliary chassis 40 and trailing axle 30 in their fully stowed condition as shown in FIG. 1 and the dump body 14 containing a load, the dump body can be tilted to dump the load with the trailing axle positioned as shown in FIG. 1 provided the trailing axle wheels 32 do not interfere with the operation of the tailgate 16. And in instances where the trailing axle wheels 32 could interfere with the operation of the tailgate 16 such as when dumping large rocks or other objects, the auxiliary chassis 40 and trailing axle 30 can be swung to their partially deployed positioning shown in FIG. 2 and the dump body 14 can then be tilted as shown in FIG. 4 to dump such a load. Wherein this deploying of the auxiliary chassis 40 and trailing axle 30 is carried out by the pneumatic circuit 146 by (A) opening the chassis-retracting valve (CRV) 150 and exhaust valve (EV) 156, and (B) closing the chassis-extending valve (CEV) 154 and exhaust valve (EV) 152 serving the pneumatically-operated actuator 124. Whereby the pneumatically-operated actuator 124 will retract and the auxiliary chassis 40 and thus the trailing axle 30 will swing in the counter-clockwise direction about the aligned axis of the pivot pins 58 as viewed in FIG. 1 from their positioning in FIG. 1 to their positioning shown in FIG. 2. Whereby the top cover 126 of the auxiliary chassis 40 on full retraction of the pneumatically-operated actuator 124 is forced against the elastomeric pads 144 on the cross-member 52 and the auxiliary chassis 40 and trailing axle 30 and trailing axle wheels 32 are located substantially above and clear of the tailgate 16 as shown in FIG. 4 for dumping a load. And following the dumping of a load, the auxiliary chassis 40 and trailing axle 30 can be swung and firmly held in their fully stowed condition shown in FIG. 1 once again by the sequence of operations previously described for vehicle transit.

And when a load is added to the dump body 14 at any time with the auxiliary chassis 40 and trailing axle 30 in their stowed condition and there is recognized that certain trailing axle use is warranted to aid in supporting the added weight on the truck chassis 18, the vehicle operator can then deploy the auxiliary chassis 40 and trailing axle 30 with the trailing axle suspension system 38 from their stowed condition shown in FIG. 1 and establish them in their deployed condition shown in solid lines in FIG. 3. Wherein the auxiliary chassis 40 and trailing axle 30 are first swung to their deploying positioning shown in FIG. 2 with the full retraction of the pneumatically-operated actuator 124 by the pneumatic control circuit 146 as described above. And the hydraulically-operated actuators 48 are then extended by the hydraulic circuit 100 by (A) opening deploying valve (DV) 116 and closing exhaust valve (EV) 118, (B) closing stowing valve (SV) 112 and opening exhaust (EV) valve 114, and (C) setting the actuator operating pressure to a prescribed pressure with the pressure regulator valve (RV) 108 or controlling this pressure during actuator extension. With the auxiliary chassis 40 and trailing axle 30 during the extension of the hydraulically-operated actuators 48 shown in phantom-lines in FIG. 3 during their lowering and eventually established in their fully deployed condition shown in solid-lines in FIG. 3 with the tires of the trailing axle 30 forced against the road surface 20 by the actuators 48 to thereby provide a lift force on the auxiliary chassis 40 that acts through the auxiliary chassis suspension system 42 to help support the truck chassis 18 to the desired extent determined by the operating hydraulic pressure. And wherein the suspension geometry is determined so that the auxiliary chassis suspension arms 46 have been lowered to where they are substantially parallel to the level road surface 20 with the actuators 48 not fully extended to thereby provide for the gas springs 88 allowing limited further extension and downward travel of the trailing axle when not tilted about its pivot axis while continuing to help support the truck chassis as further described later.

With the trailing axle 30 thus deployed in helping to support the truck chassis 18, the truck may travel over bumps and depressions in the road surface 20 as well as encounter lateral forces tending to tilt the truck chassis and significant differences in elevation between the road surface supporting the truck's primary axles 22, 26A and 26B and that supporting the trailing axle 30 wherein the trailing axle will continue to help in supporting the truck chassis 18. And in the case of only one of the trailing axle wheels 32 encountering a bump or depression, the air springs 74 operate up to the extent of their limit in compression and expansion in cushioning the tilting/swinging of the trailing axle 30 about the pivot pin 68. And while the gas springs 88 in the auxiliary chassis suspension system 42 serve to cushion road-induced movement of the auxiliary chassis 40 toward and away from the truck chassis 18 resulting from road-induced movement of the trailing axle 30 when not tilted with respect to the auxiliary chassis 40.

Figure 15:
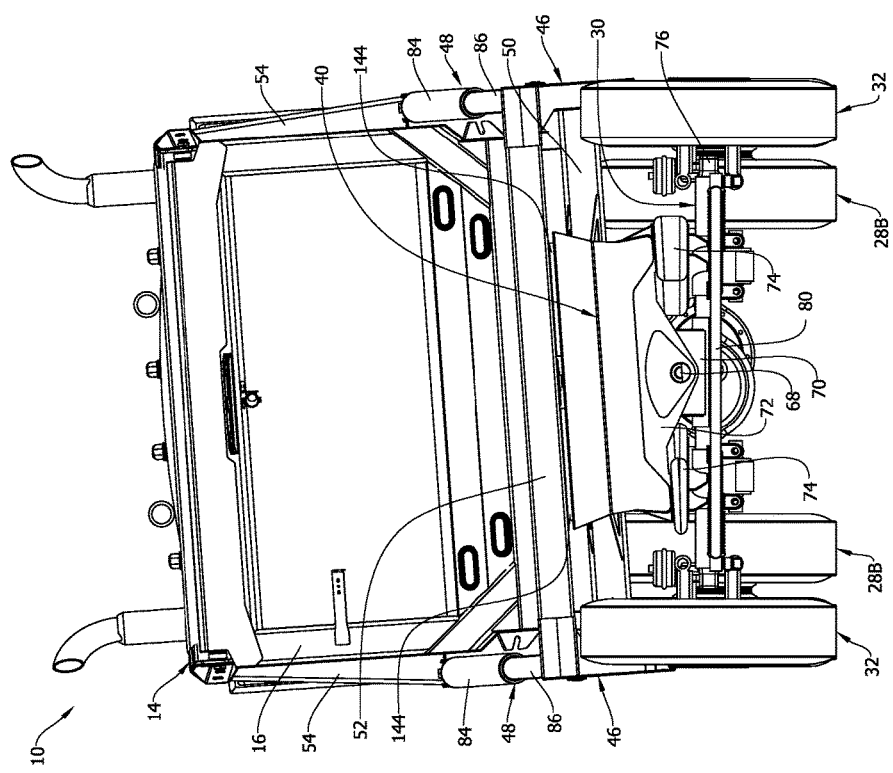
FIG. 15 is rear view of the dump truck with the trailing axle deployed wherein the dump truck chassis has tilted about its roll axis.

And with regard to the dump truck 10 being subjected to laterally directed forces tending to tilt the cab 12 and dump body 14 and thereby the truck chassis 18 about their roll axis that is determined by the trucks primary axles suspension systems, such laterally directed forces can be due to crosswinds and also centripetal forces when navigating turns at speed or making sudden changes in direction such as when quickly changing lanes on a highway. And in such events, the trailing axle pivot pin 68 and air springs 74 accommodate such tilting of the truck chassis 18 as shown in FIG. 15 wherein the truck chassis 18 has rolled in the counter-wise direction with the cab 12, dump body 14, and truck chassis 18 tilted at a leftward leaning angle as shown. And wherein the auxiliary chassis suspension arms 46 and actuators 48 and thus the auxiliary chassis 40 are likewise tilted via the suspension support members 54 attached to the dump body 14 while the wheels 32 of the trailing axle 30 remain forced against the road surface 20. And wherein the air springs 74 located to the left of the trailing axle pivot pin 68 are compressed while the air springs 74 located to the right of this pivot pin are extended as viewed in FIG. 15. And with the volume of the air within the air springs 74 being unchanged, the pressure within and therefore the force exerted by the air springs on the left on being compressed is increased while the pressure within and force exerted by the air springs on the right on extending is correspondingly decreased. Whereby the air springs 74 produce a net torque acting on the trailing axle in the clockwise direction as viewed in FIG. 15 and thus aid the truck's primary axle suspension systems in stabilizing the truck chassis 18 and thereby the cab 12 and dump body 14 against such tilting forces. And with such stabilizing force provided by the trailing axle suspension system 38 being adjustable by simply changing the air pressure in the air springs 74 when the dump truck is stationary. Including temporarily providing the air springs 74 at one side of the trailing axle pivot pin 68 with a pressure higher than that in the air springs on the opposite side to increase the trailing axle stabilizing torque that can be utilized to advantage to assist in stabilizing the truck chassis 18 against a significant tilting force such as can occur with the truck stationary and the dump body 14 being loaded in a matter tending to tilt the truck chassis 18 about its roll axis.

Turning now to situations where significant differences in elevation are encountered with the trailing axle 30 helping to support the truck chassis 18 and referring to the FIG. 16, the trailing axle 30 is shown traveling on a downwardly inclined section 20A in the road surface 20 that is behind the truck's primary axles 22, 26A and 26B and thereby requires location of the trailing axle at a different elevation on the road section 20A that is above the road elevation at the truck's primary axles. And in accommodating this road situation, the trailing axle wheels 32 with their forced contact with the road section 20A have effected forced retraction of the hydraulically-operated actuators 48 from their normal deployment condition by the hydraulic fluid displacement enabled by the action of the gas springs 88 thereby allowing the auxiliary chassis 40 to have raised with respect to the truck chassis 18 while the actuators 48 continue to provide force on the auxiliary chassis enabling the forced loading of the trailing axle 30. Whereby the trailing axle wheels 32 have remained in forced contact with the road section 20A and the trailing axle 30 continues to help in supporting the truck chassis 18 under the action of the hydraulically-operated actuators 48 and with the ability of the trailing axle suspension system 38 to accommodate steeper downwardly inclined road sections behind the truck's primary axles to the extent enabled by the gas springs 88. And wherein it will be appreciated that during such forced retraction of the hydraulically-operated actuators 48, the increase in hydraulic pressure associated with the retraction is inversely proportional to the volume of the accumulator tank 92. And wherein the air springs 74 in the axle suspension system 44 continue to serve in cushioning the swinging movement of the trailing axle 30 about its pivot axis.

Another example of significant differences in elevation between the road surface supporting the truck's primary axles 22, 26A and 26B and that supporting the trailing axle 30 is shown in FIG. 17 where the trailing axle 30 is shown traveling on an upwardly inclined section 20B in the road surface 20 that is behind the truck's primary axles and thereby requires location of the trailing axle at a different elevation on the road section 20B that is below the road elevation at the truck's primary axles. And in accommodating this road situation, the trailing axle wheels 32 with their forced contact with the road section 20B have effected further extension of the hydraulically-operated actuators 48 from their normal deployment condition by the hydraulic fluid displacement enabled by the action of the gas springs 88 thereby allowing the auxiliary chassis 40 to have lowered with respect to the truck chassis 18 while the actuators 48 continue to provide force on the auxiliary chassis enabling the forced loading of the trailing axle 30. Whereby the trailing axle wheels 32 have remained in forced contact with the road section 20B and the trailing axle 30 continues to help in supporting the truck chassis 18 under the action of the hydraulically-operated actuators 48 and with the ability of the trailing axle suspension system 38 to accommodate steeper upwardly inclined road sections behind the primary axles to the extent enabled by the gas springs 88. And wherein it will be appreciated that during such further extension of the hydraulically-operated actuators 48, the decrease in hydraulic pressure associated with the extension is also inversely proportional to the volume of the gas accumulator tank 92. And wherein the air springs 74 in the axle suspension system 44 continue to serve in cushioning the swinging movement of the trailing axle 30 about its pivot axis.

Describing now the stowing of the auxiliary chassis 40 and trailing axle 30 following trailing axle use and with reference to FIG. 3, the vehicle operator via the CCM 122 and MCVC 120 stows the auxiliary chassis and trailing axle by reversing the sequential deploying operations previously described. And upon raising the suspension arms 46 to their stowed condition with the hydraulically-operated actuators 48 and hydraulic circuit 100, the operator can choose to maintain the auxiliary chassis 40 and trailing axle 30 in their positions shown in FIG. 2 with the pneumatically-operated actuator 124 remaining in its retracted condition as shown in FIG. 2 when tilting the dump body 14 for dumping a load as shown in FIG. 4. Or if the fully stowed condition of the auxiliary chassis 40 and trailing axle 30 is desired for dumping a load, the operator can establish the auxiliary chassis 40 and trailing axle 30 in their fully stowed position shown in FIG. 1 by extension of the pneumatically-operated actuator 124 via the pneumatic circuit 146 prior to dumping the load. And with the dump body 14 emptied following the dumping of a load and the trailing axle 30 therefore not needed to help support the truck chassis 18, the trailing axle suspension system 38 is controlled as previously described to establish the auxiliary chassis 40 and trailing axle 30 in their fully stowed and firmly held condition as shown in FIG. 1 to minimize the height of the trailing axle 30 and thereby its wheels 32 for transit on public roadways.

And having described the operation of the trailing axle suspension system 40 covering various road conditions that can be encountered, it will be appreciated that the force acting on the auxiliary chassis 40 provided by the hydraulically-operated actuators 48 is applied against the road surface 20 via the trailing axle wheels 32 and results in the trailing axle 30 supporting a portion of the weight carried by the truck chassis 18 according to the hydraulic pressure supplied to these actuators prescribed by the vehicle operator. With the hydraulic pressure supplied being variable and selected to provide the desired degree of help provided by the trailing axle 30 in supporting the truck chassis 18 with a certain load and the hydraulic pressure then being maintained throughout various road-encountered conditions as described above.

Figure 11:
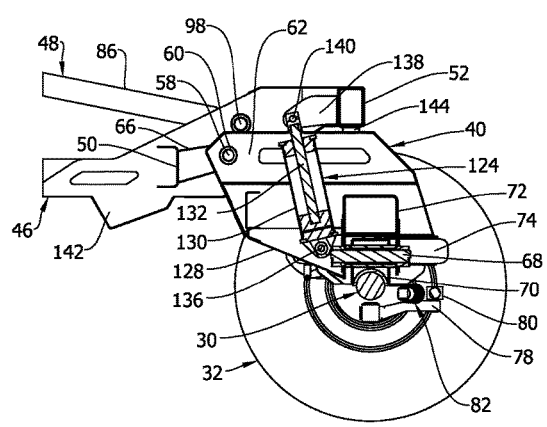
FIG. 11 is a view taken along the lines 11-11 in FIG. 10 when looking in the direction of the arrows.
Figure 12:
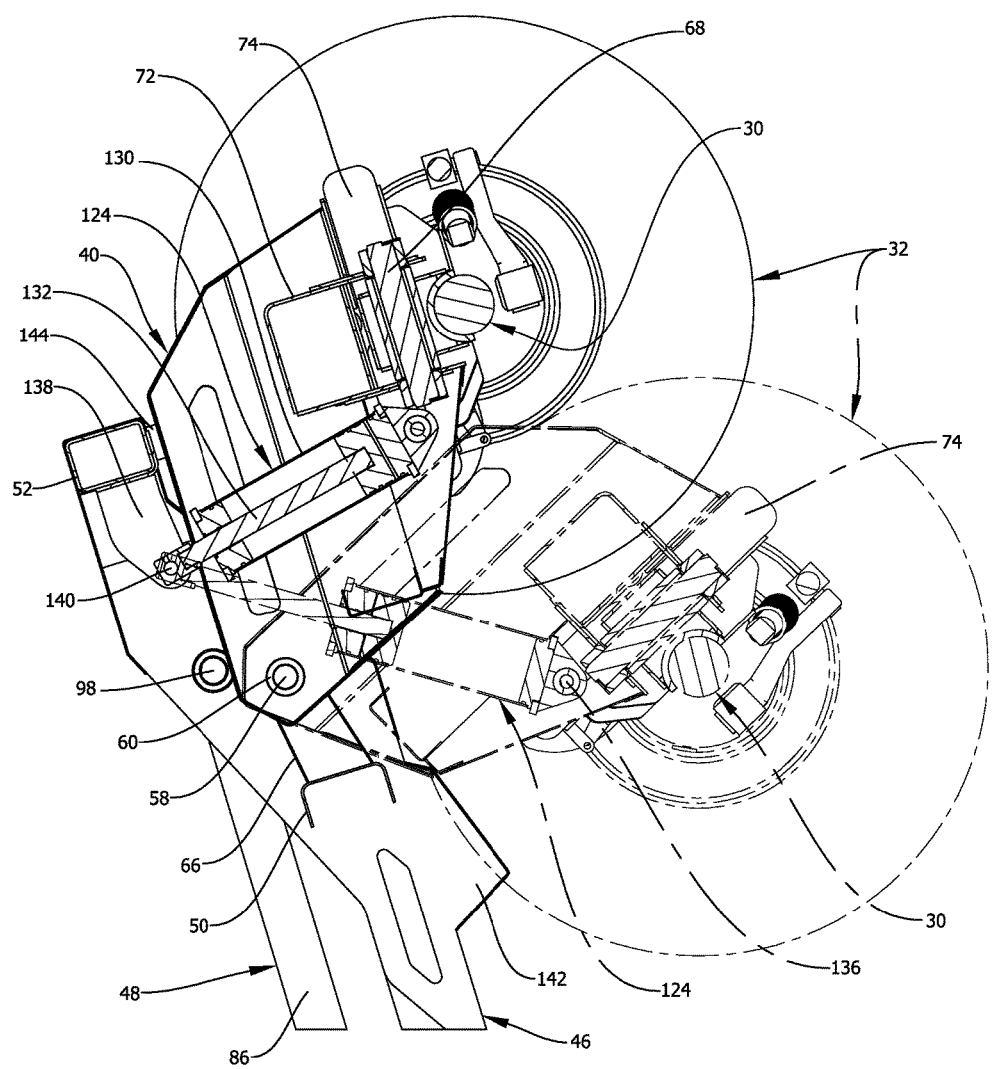
FIG. 12 is a view like FIG. 11 but enlarged and with certain components of the trailing axle suspension system shown in solid lines and in phantom lines in establishing trailing axle stowage and deployment.
Figure 13:
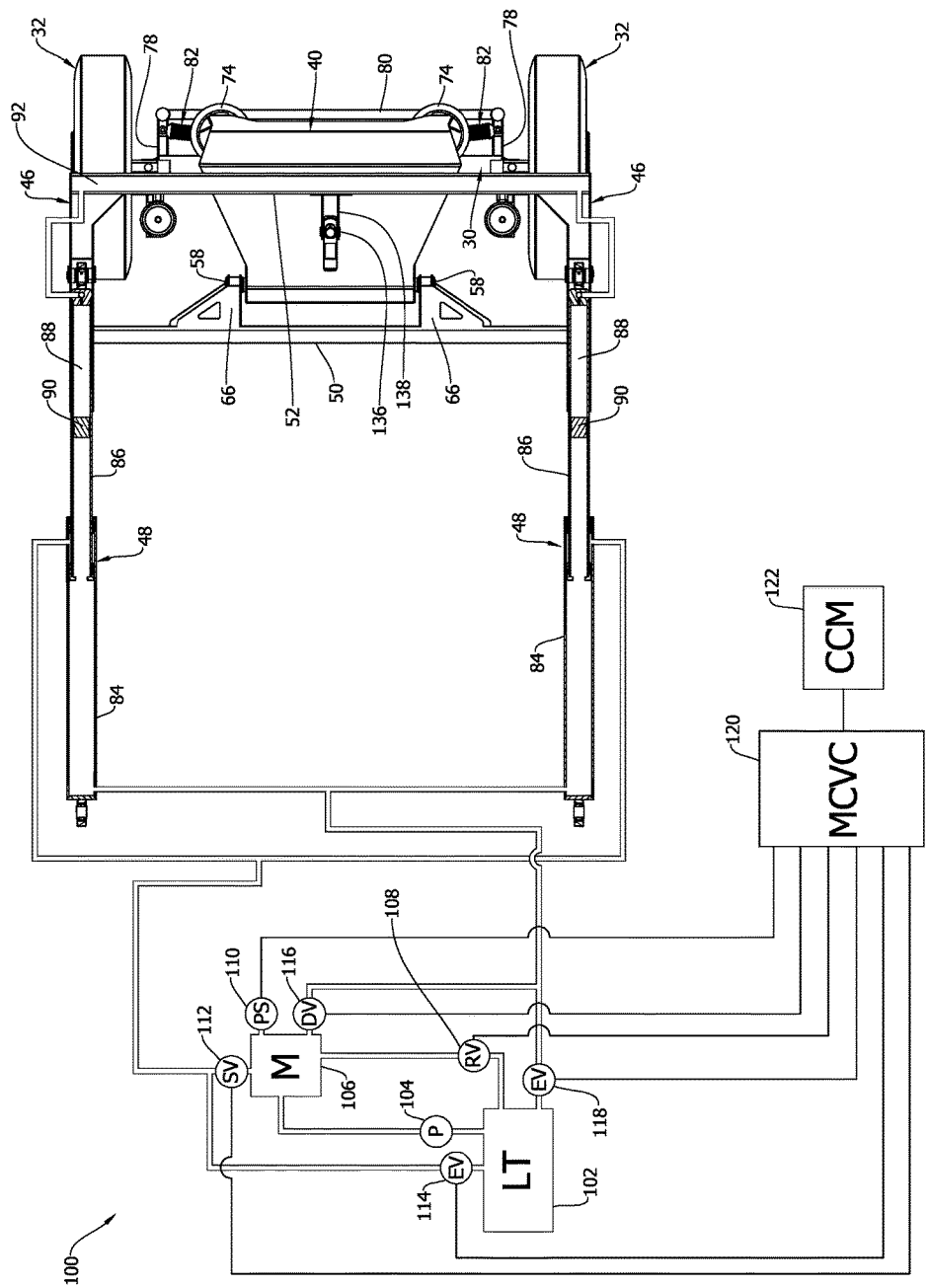
FIG. 13 is a schematic of the control system that controls the auxiliary chassis suspension system portion of the trailing axle suspension system.

Moreover, it will be appreciated that the force provided by the hydraulically-operated actuators 48 is applied to the auxiliary chassis 40 and thus the trailing axle 30 by both the cross-member 50 and cross-member 52. Wherein the auxiliary chassis 40 is pivotally connected to the cross-member 50 and thereby pivotally supported by the suspension arms 46 and is forced at its top side (cover 126) against the bottom side of the cross-member 52 via the elastomeric pads 144 in establishing the trailing axle 30 in its fully stowed condition in a firm holding manner as well as when forcing the trailing axle 30 when deployed in helping to support the truck chassis 18 to a variable degree provided by the action of the hydraulically-operated actuators 48. Furthermore, the trailing axle 30 and its wheels 32 are located rearward of the pivot axis provided by the axially aligned pivot pins 58 pivotally supporting the auxiliary chassis on the auxiliary chassis suspension arms 46 when the trailing axle is in the deployed condition and the cross-member 52 then engages the auxiliary chassis 40 at a location above the trailing axle 30. Whereby a major portion of the force applied by the hydraulically-operated actuators 48 is transmitted by the cross-member 52 to the auxiliary chassis 40 while the pivot pins 58 and cross-member 50 transfer only the remainder in addition to supporting the auxiliary chassis and thus substantially less than that transferred to the auxiliary chassis suspension arms 46 by the cross-member 52. And with the cross-member 52 being located substantially directly above the trailing axle 30 when the trailing axle is helping to support the truck chassis 18 as shown in FIG. 11, it will also be appreciated that the trailing axle 30 exerts substantially only vertical force upwardly against the cross-member 52 and that force will be substantially equal to the net lifting force of the trailing axle in helping to support the truck chassis. Whereby the force transmitted by the cross-member 52 supporting the auxiliary chassis 40 is minimized and unidirectional. In addition, it will be appreciated that only one elastomeric pad of suitable length in providing the desired structural compliance and shock absorption could be fixed to the cross-member 52 and that one or more elastomeric pads could be fixed to the cover 126 of the auxiliary chassis 40 instead of to the cross-member 52 and provide the functioning described in forcing the auxiliary chassis to help support the motor vehicle chassis.

It will also be appreciated that when the trailing axle 30 encounters other forces aside from the normal lift force when in its deployed position, the cross-member 52 assists in the transfer of such forces to the auxiliary chassis suspension arms 46. For example, lateral forces such as when the vehicle tilts as shown in FIG. 15 wherein the air springs 74 then exert a net stabilizing torque about the trailing axle pivot pin 68 and the cross-member 52 transmits a substantially increased proportion of such forces to the auxiliary chassis suspension arms 46. Wherein it will also be appreciated that such lateral forces are transferred to the auxiliary chassis suspension arms 46 by both of the cross-members 50 and 52 in substantially equal amounts. And with the cross-members 50 and 52 rigidly joining the suspension arms 46, it will also be appreciated that the structural stresses produced by these forces are less concentrated than if there was only a single member rigidly joining the suspension arms 46 as well as providing for pivotal support of the auxiliary chassis 40 by these suspension arms.

Figure 18:
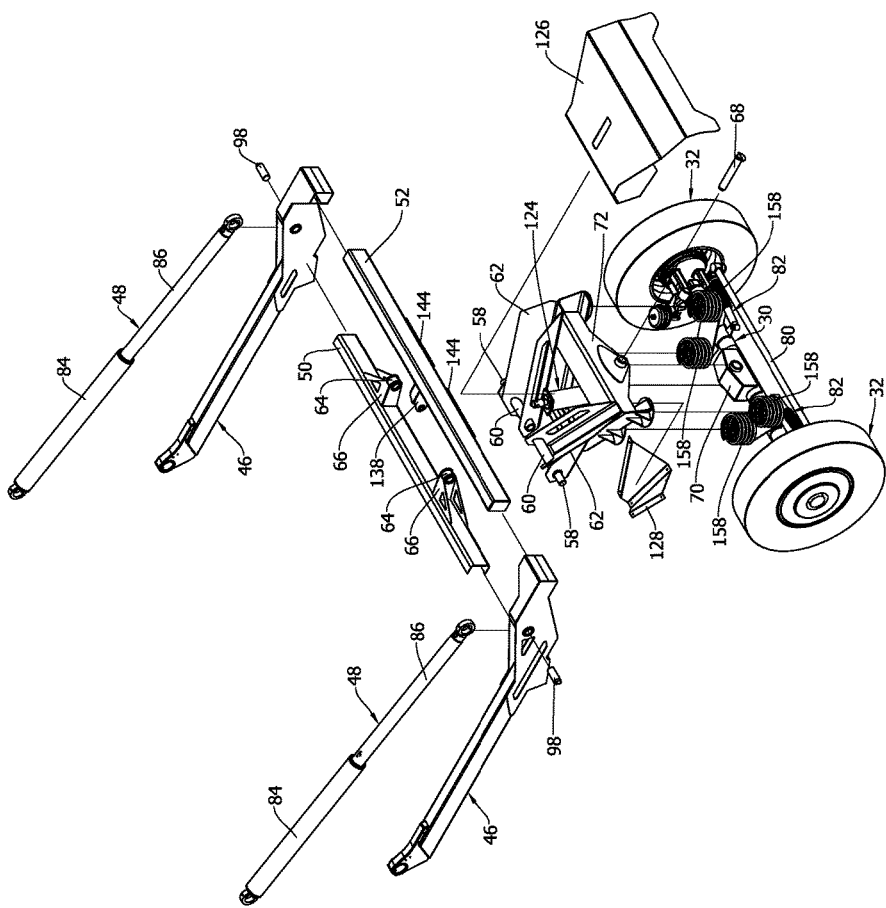
FIG. 18 is a partially-exploded perspective view like in FIG. 8 but wherein the axle suspension system portion of the trailing axle suspension system employs coil springs instead of air springs in forming another embodiment of the trailing axle suspension system according to the present invention.
Figure 19:
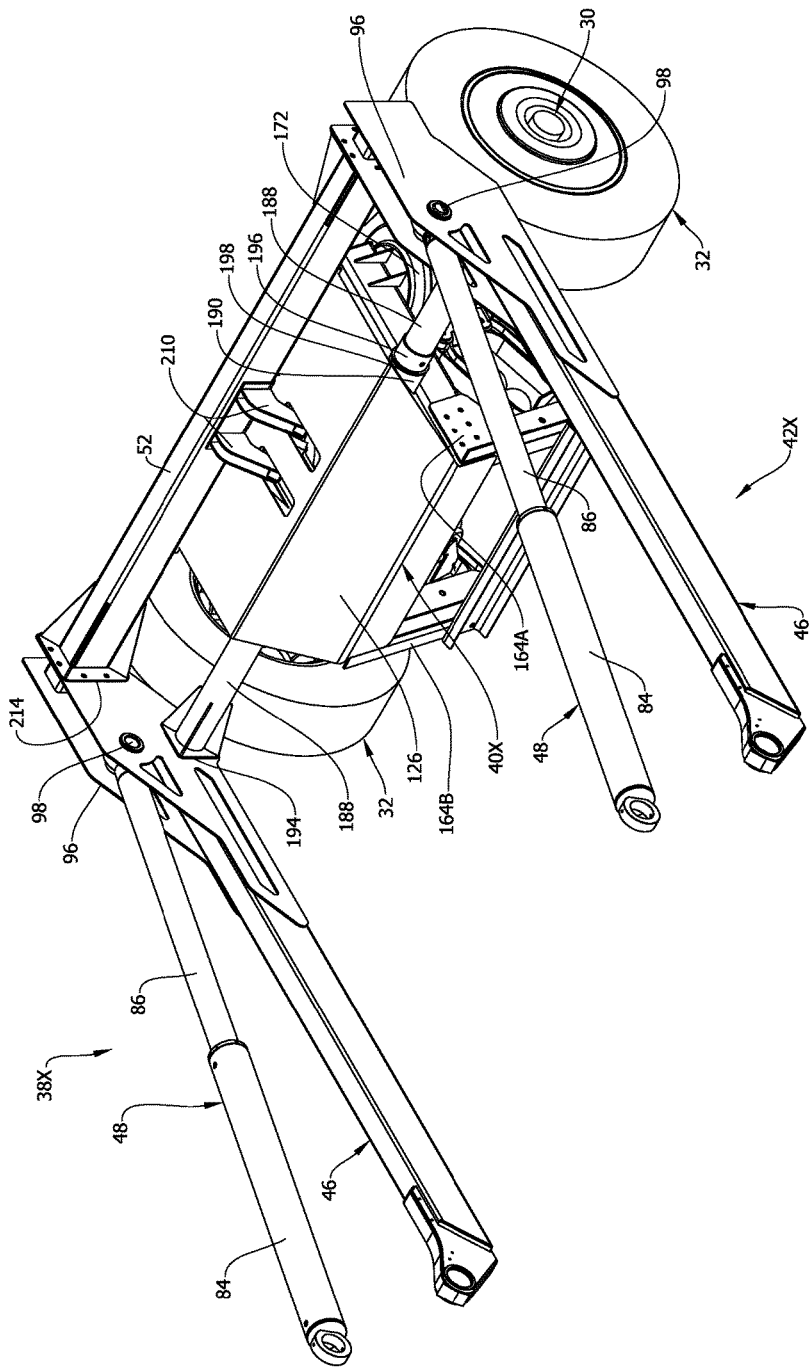
FIGS. 19 and 20 are perspective views of another embodiment of the trailing axle suspension system according to the present invention.
Figure 20:
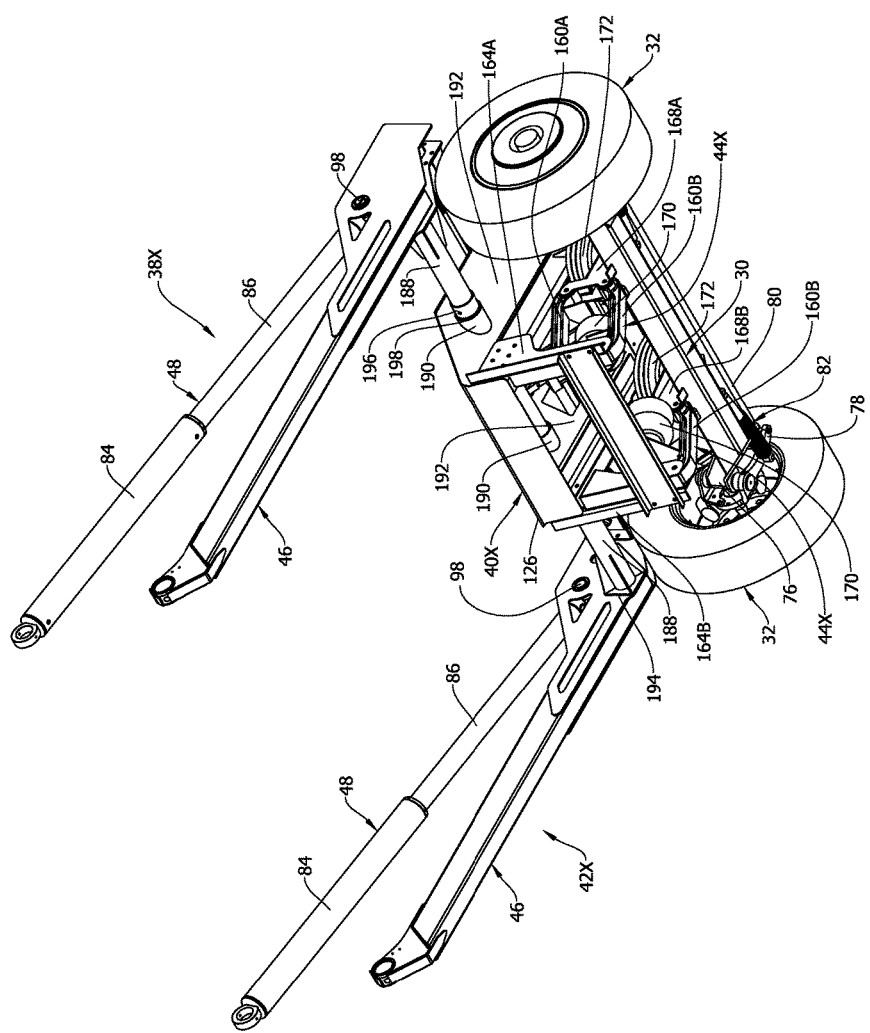
Figure 24:
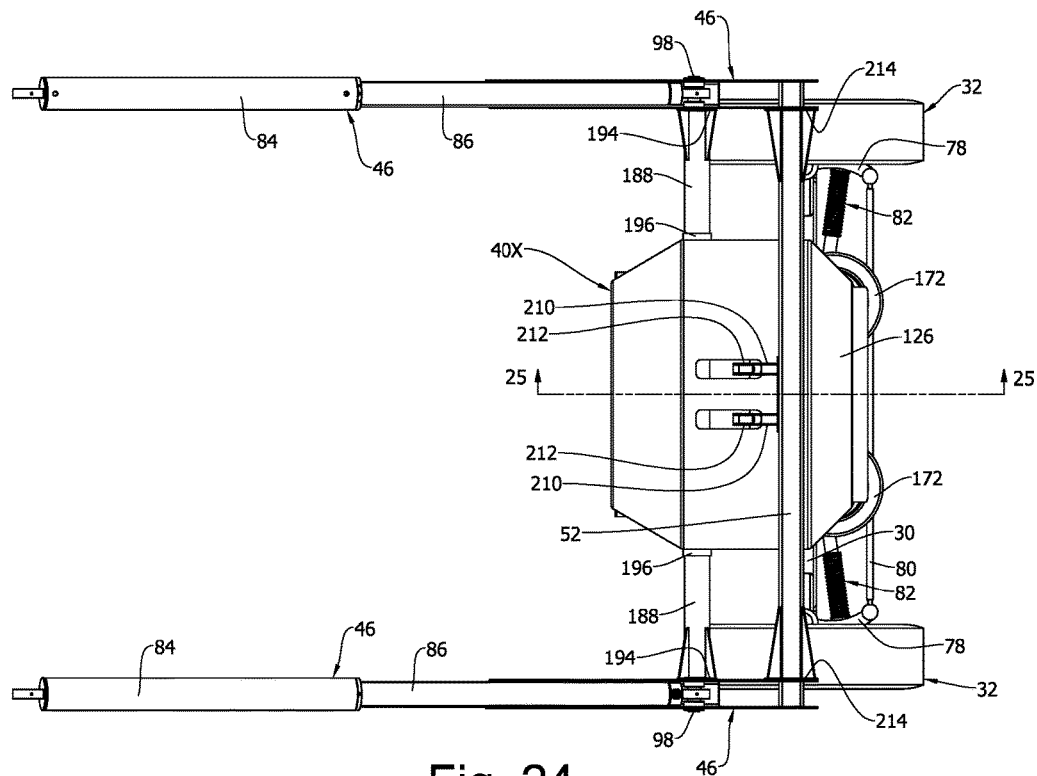
FIG. 24 is an overhead view of the embodiment of the auxiliary axle suspension system in FIGS. 19 and 20.

It will also be appreciated that the trailing axle suspension springs in the exemplary embodiment of the trailing axle suspension system 38 shown in FIGS. 1-17 can take other forms such as shown in FIG. 18. Wherein the air springs 74 have been replaced with matching coil springs 158 having a suitable spring rate. Moreover, it will be understood with respect to the FIGS. 1-17 embodiment and FIG. 18 embodiment that pairs of matching springs are employed on the opposite sides of the trailing axle pivot axis in providing a certain desired springing/cushioning action desired. And that such desired action can also be provided with only one air spring of suitable spring-rate capacity located on each such side of the trailing axle pivot axis and with only one coil spring of suitable spring-rate capacity located on each such side of the trailing axle pivot axis. And it will also be understood that instead of air springs or coil springs, a suitable leaf spring arrangement or torsion-bar spring arrangement could be utilized and operate in essentially the same manner.

And referring now to another exemplary embodiment of the trailing axle suspension system according to the present invention shown in FIGS. 19-28, it and its primary components corresponding to those in FIGS. 1-18 are identified with the same reference numbers but now with the suffix "X" and alternatively utilized components are identified with distinguishing reference numbers as indicated. With the trailing axle suspension system 38X shown in FIGS. 19-28 thus comprising an auxiliary chassis 40X, an auxiliary chassis suspension system 42X and an axle suspension system 44X. Wherein the structure of the auxiliary chassis 40X differs from that of the auxiliary chassis 40 previously described, the auxiliary chassis suspension system 42X suspends the auxiliary chassis 40X from the truck chassis 18 via the dump body 14 in a manner different from that of the auxiliary chassis suspension system 42 previously described, and the axle suspension system 44X suspends the trailing axle 30 from the auxiliary chassis 44X also in a manner different from that of the axle suspension system 44 previously described. And with this exemplary embodiment thereby disclosing the further versatility of the trailing axle suspension system according to the present invention in meeting certain other desirable objectives utilizing the combined auxiliary chassis suspension system and axle suspension system.

Considering first the axle suspension system 44X, it comprises two parallel-arranged matching sets of parallel upper and lower suspension arms 160A and 160B respectively of equal operating length. Wherein the suspension arms 160A and 160B are pivotally connected at one end by axially-aligned pivot pins 162A and-axially-aligned pivot pins 162B to auxiliary chassis framework members 164A and 164B respectively. And the suspension arms 160A and 160B are pivotally connected at their other end by axially-aligned pivot pins 166A and axially-aligned pivot pins 166B to brackets 168A and 168B respectively that are fixed to the trailing axle 30 at locations inboard and adjacent to the steering knuckles 76 at the ends of the trailing axle. See FIGS. 20, 23 and 25.

And for controlling movement of the thus suspended trailing axle 30, there is provided two parallel-arranged matching pneumatically-operated actuators 170 of the elastomeric-bag type and air springs 172 that are also of the elastomeric-bag type. Wherein the laterally-spaced actuators 170 are connected at one end to the upper suspension arms 160A at a location near the rearward end of these arms and connected at their other end to the lower suspension arms 160B at a location near the forward end of these arms. Whereby the actuators 170 act in a swinging manner between the auxiliary chassis 40X and the trailing axle 30 in effecting trailing axle retraction for stowage. Whereas the laterally-spaced air springs 172 are mounted to act in a substantially upright manner between the trailing axle 30 and the auxiliary chassis 40X in providing spring action cushioning road-induced trailing axle movement relative to the auxiliary chassis 40X and thereby with respect to the truck chassis 18.

Figure 25:
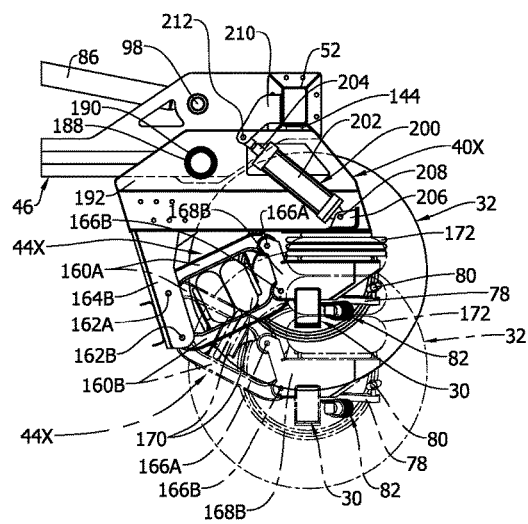
FIG. 25 is an enlarged view taken along the lines 25-25 in FIG. 24 when looking in the direction of the arrows wherein the trailing axle is shown stowed with respect to the auxiliary chassis in solid lines and in phantom lines when deployed from the auxiliary chassis with full extension of its air springs.

And wherein the actuators 170 when supplied with air pressure while the air springs 172 are exhausted of air pressure raise and thereby stow the trailing axle 30 with respect to the auxiliary chassis 40X as shown in solid lines in FIG. 25. And the air springs 172 when supplied with a controllable air pressure while the actuators 170 are exhausted of air pressure lower and thereby deploy the trailing axle 30 with respect to the auxiliary chassis 40X to the extent shown in phantom-lines in FIG. 25.

Figure 26:
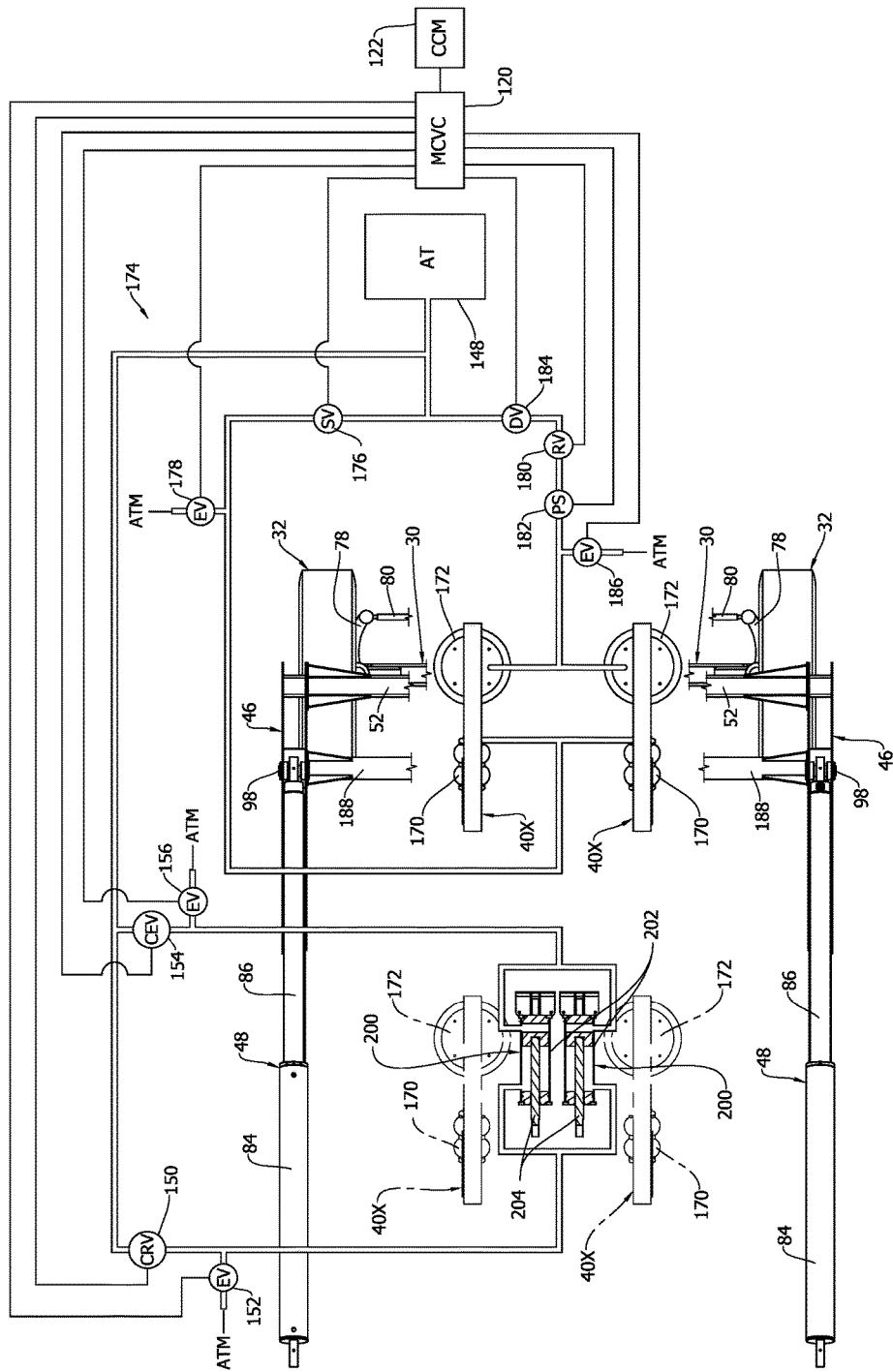
FIG. 26 is a schematic of the control system controlling the trailing axle suspension system in FIGS. 19-25.

Continuing with the description of the exemplary embodiment in FIGS. 19-28 and referring now to FIG. 26, the operation of the pneumatically-operated actuators 170 and air springs 172 is controlled by a pneumatic circuit 174 that is supplied by the air tank (AT170 there is provided an axle stowing/raising valve (SV) 176 and exhaust valve (EV) 178 that provide for pressurizing the actuators 170 with tank pressure and thereby raising the trailing axle 30 to its stowed position with respect to the auxiliary chassis 40X as shown in solid lines in FIG. 25 provided the air springs 172 are not pressurized. With the axle stowing/raising valve (SV) 176 and exhaust valve (EV) 178 also providing for exhausting the pneumatically-operated actuators 170 of air pressure to allow unimpeded action by the air springs 172 to deploy the trailing axle 30 from the auxiliary chassis 40X when they are pressurized.

And for the operation of the air springs 172, there is provided a regulator valve (RV) 180 for regulating the air pressure supplied to the air springs 172, a pressure sensor (PS) 182 that senses the regulated air pressure and provides feedback for controlling the operation of the pressure regulator valve (RV) 180 in providing the desired pressure for the functioning of the air springs 172 and indication of the pressure presently acting in these air springs, an axle deploying/lowering valve (DV) 184 and associated exhaust valve (EV) 186 that provide for establishing this air pressure in the air springs 172 and thereby deploying/lowering the trailing axle 30 with respect to the auxiliary chassis 40X using the pressure determined by the pressure regulator valve (RV) 180. With the exhaust valve (EV) 186 also providing for exhausting the air springs 172 of pressure to allow the pneumatically-operated actuators 170 when pressurized to raise the trailing axle 30 to its stowed position with respect to the auxiliary chassis 40X as shown in solid lines in FIG. 25.

The valves in the pneumatic circuit 174 are of a conventional electrically-operated type, are interconnected as shown and like the pneumatic circuit 146, the valves are controlled by the MCVC 120 that is under the command of the CCM 122 at the direction of the vehicle operator. And with the pressure regulator valve (RV) 180 being operable to regulate the air pressure supplied to the air springs 172 in accordance with controlled voltage input.

Continuing on with the description of the trailing axle suspension system 38X and with respect to the auxiliary chassis suspension system 42X and the pivotal support of the auxiliary chassis 40X with the auxiliary chassis suspension arms 46, there is now provided a shaft 188 that extends between the suspension arms 46 and is received midway by two spaced sleeves 190 that are fixed to spaced framework members 192 of the auxiliary chassis 40X. And wherein the shaft 188 is fixed at its ends with a gusseted end plate 194 that is welded to the shaft 188 and the auxiliary chassis suspension arms 46 to thereby rigidly join the auxiliary chassis suspension arms 46 and locate the axis of the shaft 188 parallel to that of the auxiliary chassis suspension arms' pivot pins 56 and the hydraulically-operated actuators' pivot pins 94 and 98. And to prevent sliding movement of the auxiliary chassis 40X along the shaft 188 from its centered location between the auxiliary chassis suspension arms 46, there is provided stop collars 196 that are fixed to the shaft 188 at locations adjacent the outer end of the shaft-supporting sleeves 190 and with a self-lubricating thrust washer 198 located there between to minimize friction. Whereby the auxiliary chassis 40X is pivotally supported by the auxiliary chassis suspension arms 46 in a direct manner by the shaft 188 instead of via the cross-member 50 in the previous exemplary embodiments.

Continuing on with the description of the trailing axle suspension system 38X and with respect to the axle suspension system 44X, there is now provided a pair of matching parallel-arranged pneumatically-operated actuators 200 that swing the auxiliary chassis 40X relative to the auxiliary chassis suspension arms 46 and thereby the trailing axle 30 relative to these suspension arms. With the two actuators 200 being similar to the pneumatically-operated actuator 124 previously described and employed to increase the force that is available to position the auxiliary chassis 40X relative to the auxiliary chassis suspension arms 46 as intended and is based on various factors including the air pressure available on a particular motor vehicle, the force each actuator can produce with the available air pressure, and the weight of the auxiliary chassis 40X and suspended trailing axle 30 with its wheels 32.

The pneumatically-operated actuators 200 are similar to the pneumatically-operated actuator 124 previously described in both form and function with each comprising a cylinder 202 and piston-operated rod 204. Wherein the actuators 200 are arranged in side-by-side relationship and centrally located and mounted between the auxiliary chassis suspension arms 46 with each of the cylinders 202 pivotally connected at its closed end to the auxiliary chassis 40X with a bracket 206 and pivot pin 208 and each of the piston-operated rods 204 pivotally connected at its operating end to the cross-member 52 with a bracket 210 and pivot pin 212. Whereby the pneumatically-operated actuators 200 when extended cooperatively establish the auxiliary chassis 40X in a stowed condition as shown in FIG. 21 and when retracted establish the auxiliary chassis 40X in a deployed condition as shown in FIG. 22.

In addition, in this embodiment of the load-bearing cross-member 52 it has a gusseted mounting plate 214 that is welded to each end of the cross-member 52 and bolted in a detachable manner as shown to the auxiliary chassis suspension arms 46 at their rearward end. With this being for the purpose of facilitating servicing the auxiliary chassis and other components of the trailing axle suspension system at this end. And it will be appreciated that this modification is also applicable to the other embodiments of the trailing axle suspension system.

And referring again to FIG. 26, the two pneumatically-operated actuators 200 are controlled by a pneumatic circuit 174 like the pneumatic circuit 146 previously described. Except for the pneumatic circuit 174 being connected to control the two actuators 200 so that they extend and retract in unison with the same valve operation previously described in respect to the pneumatically-operated actuator 124 provided by the master control valve center (MCVC) 120 under the command of the vehicle operator from the central command module (CCM) 122.

And with respect to the auxiliary chassis suspension system 42X employed in the trailing axle suspension system 38X, the cylinder 84 of the hydraulically-operated actuators 48 has been shortened as compared with that in the auxiliary chassis suspension system 42 such that the actuators 48 are fully extended when the auxiliary chassis suspension arms 46 have been lowered to positions substantially parallel with the road surface with the trailing axle 30 in its deployed position helping to support the truck chassis 18 as shown in solid lines in FIG. 22. Wherein the extension of the air springs 172 in the axle suspension system 44X rather than the gas springs 88 in the auxiliary chassis suspension system 42 then accommodate instances where the trailing axle 30 is at a lower elevation than the truck's primary axles 22, 26A and 26B while continuing to help support the truck chassis 18 as described in further detail later. In addition, the angled portion 142 of the auxiliary chassis suspension arms 46 is omitted because the tires of the trailing axle wheels 32 in this embodiment are smaller in outer diameter than those in the previous embodiments. Such that the trailing axle 30 can be swung to a greater angle in establishing its stowed condition without interfering with operation of the tailgate 16 thereby allowing the tires of the trailing axle wheels 32 to be forced against the suspension arms 46 by the pneumatically-operated actuators 200 as shown in FIG. 21 without the provision of the projecting angled suspension arm portion 142 and thereby firmly hold the trailing axle 30 and auxiliary chassis 40X in their stowed condition and during transit.

Describing now a typical sequence of operations in utilizing the trailing axle 30 employing the trailing axle suspension system 38X and starting with the auxiliary chassis 40X and the trailing axle 30 in their stowed condition shown in FIG. 21, the pneumatically-operated actuators 200 are retracted with the pneumatic circuit 174 via the MCVC 120 and CCM 122 in the same manner as previously described with respect to the retraction of the singular pneumatically-operated actuator 124. Wherein the auxiliary chassis 40X and thus the trailing axle 30 will swing from their positioning shown in FIG. 21 to their positioning shown in phantom lines in FIG. 22 while the hydraulically-operated actuators 48 are being extended to swing the auxiliary chassis suspension arms 46 from their stowed position shown in FIG. 21 to their deployed position shown in solid lines in FIG. 22 with the operation of the hydraulic circuit 100 via the MCVC 120 and CCM 122 in the same manner as previously described with respect to the extension of the hydraulically-operated actuators 48. And with the cylinder 84 of the actuators 48 shortened as described above, the hydraulically-operated actuators 48 are fully extended when the suspension arms 46 are in the deployed position in a normal ride height condition substantially parallel with the road surface 20 as shown in solid lines in FIG. 22, and with the pressure regulator valve (RV) 108 in the hydraulic circuit 100 set according to the resistive force to be applied to the auxiliary chassis 40X which is determined based on the maximum lift force to be applied by the air springs 172 on the auxiliary chassis 40X and described in further detail later.

Continuing on with the sequence of operations with respect to the trailing axle suspension system 38X with the pneumatically-operated actuators 200 and hydraulically-operated actuators 48 in their respective deployment conditions as shown in solid lines in FIG. 22, the trailing axle 30 is then deployed from the auxiliary chassis 40X by the extension of the air springs 172 and retraction of the pneumatically-operated actuators 170 in the axle suspension system 44X with the pneumatic circuit 174 via the MCVC 120 and CCM 122. Wherein the operator (A) closes the axle-stowing valve (SV) 176 and opens the exhaust valve (EV) 178 serving the pneumatically-operated actuators 170, (B) opens the axle-deploying valve (DV) 184 and closes the exhaust valve (EV) 186 serving the air springs 172, and (C) sets the pressure regulator valve (RV) 180 to the desired pressure according to the desired force to be applied by the air springs 172. Whereby the air springs 172 are extended while the actuators 170 are retracted and thus the trailing axle 30 is deployed relative to auxiliary chassis 40X and the air springs 172 apply downward force against the trailing axle 30 and thus force the tires of the trailing axle wheels 32 against the road surface 20 according to the operating air pressure set by the operator via pressure regulator valve (RV) 180, while the hydraulically-operated actuators 48 provide resistive force against the suspension arms 46 and thus the auxiliary chassis 40X. And with the air pressure in the air springs 172 controlled by the vehicle operator with the pressure regulator valve (RV) 180 via the MCVC 120 and CMM 122 in providing and maintaining the degree (amount) of help desired by the trailing axle 30 in helping to support the truck chassis 18 with the existing load in the dump body 14 under varying road conditions with the hydraulically-operated actuators 48 fully extended. Such as when one or both of the trailing axle wheels 32 encounter a bump or depression in the road surface 20 resulting in road-induced trailing axle travel not exceeding that allowed by the air springs 172 on full compression and full expansion and that enabled by the gas springs 88 in the auxiliary chassis suspension system 42X in providing for limited retraction of the hydraulically-operated actuators 48 where the forced upward travel of the trailing axle 30 exceeds that allowed by the air springs 172 on full compression.

Wherein the air springs 172 in the axle suspension system 44X on full extension determine the maximum allowed downward travel of the trailing axle 30 with respect to the truck chassis 18 while the hydraulically-operated actuators 48 continue to provide resisting force on the auxiliary chassis 40X enabling the continued forced loading of the trailing axle via the air springs 172 in causing the trailing axle 30 to help support the truck chassis 18. Such as for example when both trailing axle wheels 32 encounter a depression in the road surface 20 and when only the trailing axle wheels encounter an upwardly-inclined section 20C as shown in FIG. 27. Whereas the gas springs 88 incorporated in the hydraulically-operated actuators 48 in the auxiliary chassis suspension system 42X allow retraction of the actuators 48 to accommodate upward travel of the trailing axle 30 relative to the truck chassis 18 when such upward trailing axle travel exceeds that allowed by the air springs 172 on full compression. Wherein the extent of such extended upward trailing axle travel relative to the truck chassis is determined by the extent of the forced retraction of the hydraulically-operated actuators 48 from their normal fully extended condition provided by the hydraulic fluid displacement enabled by the gas springs 88 while the actuators 48 continue to provide resistive force on the auxiliary chassis 40X enabling the continued forced loading of the trailing axle 30 provided by the air springs 172 in causing the trailing axle to help support the truck chassis 18.

And it will also be appreciated that the air springs 172 used in the axle suspension system 44X are of the elastomeric-bag type and thus their diameters increase as these air springs are compressed and decrease when extended, and as a result at constant air pressure the air springs 172 will exert greater force when compressed than when extended. Moreover, the air springs 172 will therefore exert the greatest force when fully compressed. And when deploying the trailing axle 30 with the dump body 14 carrying a certain load, the vehicle operator can set the pressure regulator valve (RV) 180 according to the desired lift force on the truck chassis 18 to be applied by the air springs 172 and set the resistive force applied by the hydraulically-operated actuators 48 with the hydraulic pressure regulator valve (RV) 108 such that it is substantially equal to the maximum force exerted by the air springs 172 when they are fully compressed. And thus with the hydraulically-operated actuators 48 being fully extended when in their normally deployed condition they will provide resistive force against the auxiliary chassis 40X that is greater than the forced applied by the air springs 172 throughout their stroke to full extension.

And following use of the trailing axle 30, the vehicle operator reverses the above sequence of operations for deployment described above in restoring the auxiliary chassis 40X and trailing axle 30 to their stowed condition shown in FIG. 21. Wherein they are arranged and firmly held in a compact manner on the dump body 14.

And having described the above exemplary embodiments, it will be appreciated that in the trailing axle suspension system according to the present invention, the axle suspension system suspending the trailing axle from an auxiliary chassis and the auxiliary chassis suspension system suspending the auxiliary chassis from a motor vehicle chassis are adapted to cooperatively (a) establish the auxiliary chassis and trailing axle in a stowed condition on the motor vehicle chassis and (b) establish the auxiliary chassis and the trailing axle in a deployed condition at a location rearward of the motor vehicle chassis and then forcibly cause the auxiliary chassis to help support the motor vehicle chassis with the trailing axle. And that the auxiliary chassis suspension system includes a load-bearing member that is separate from the pivotal support of the auxiliary chassis and (a) rigidly joins the suspension arms and (b) is adapted to engage the auxiliary chassis in establishing the deployed condition and bear a major portion of the force causing the auxiliary chassis to help support the motor vehicle chassis with the trailing axle. Furthermore, it will appreciated that the auxiliary chassis is pivotally supported by the auxiliary chassis suspension arms in a manner such that whether the auxiliary chassis is supported from another member rigidly joining these arms or directly supported by another member rigidly joining these arms, the load-bearing member according to the present invention nevertheless bears a major portion of the force causing the auxiliary chassis to help support the motor vehicle chassis with the trailing axle and thereby relieves such other member of this duty.

It will also be appreciated that in addition to the above exemplary embodiments, the trailing axle suspension system according to the present invention is readily adaptable to a wide range of motor vehicles. For example, the motor vehicle can take various other forms such as refuse trucks, transit concrete mixing trucks, open-bed trucks, utility trucks, and military trucks. Wherein the motor vehicle may have only two primary axles with one of them powered and also one or more pusher axles and/or tag axles for auxiliary use. Or the motor vehicle may have three primary axles with two of them powered as well as one or more pusher axles and/or tag axles for auxiliary use. And the trailing axle suspension system according to the present invention is readily adaptable to accommodate such in the manner of operation described above with respect to stowing the auxiliary chassis and trailing axle with respect to the particular motor vehicle. Moreover, the trailing axle suspension system according to the present invention is readily adaptable to automated control with respect to the efficient use of the trailing axle depending on the load added to the motor vehicle.

In addition, it will be appreciated that actuators providing the intended operation can be utilized that are not of the hydraulically-operated type and take other forms suited to the objectives of the present invention. Furthermore, the gas springs incorporated with the hydraulically-operated actuators can have their piston arranged separate from the hydraulically-operated piston to operate in a like hydraulic and gas pressured manner and separately provided with a gas accumulator of adequate volume with the prescribed gas pressure charge instead of with a common gas accumulator that serves both of the actuator gas springs. Moreover and depending on the form of the axle suspension system suspending the trailing axle from the auxiliary chassis, the actuator gas springs can be dispensed with if the added trailing axle movement they provide is not called for and the desired isolation of road-induced trailing axle movement from the auxiliary chassis is provided in the axle suspension system. And the motor vehicle instead of having a tiltable dump body serving as a load container, the load container could be fixed to the motor vehicle chassis and have a roof or a stowing platform for the auxiliary chassis with the trailing axle or the motor vehicle may have an open bed and the auxiliary chassis and trailing axle would then be firmly held in the stowed condition on what is available or added. Moreover, it will be appreciated that the trailing axle wheels while normally having pneumatic tires could take some other form that provides for suitable road use.

And thus the scope of the invention is intended to be limited only by the accompanying claims.

The invention claimed is:

1. A trailing axle suspension system comprising
an auxiliary chassis,
an axle suspension system suspending a trailing axle from the auxiliary chassis wherein the trailing axle has wheels that each has a pneumatic tire,
an auxiliary chassis suspension system (a) pivotally supporting the auxiliary chassis for swinging movement about a first pivot axis transverse to the auxiliary chassis and (b) adapted to suspend the auxiliary chassis from a motor vehicle chassis for swinging movement about a second pivot axis transverse to the motor vehicle chassis,
the axle suspension system and auxiliary chassis suspension system are adapted to cooperatively establish the auxiliary chassis and trailing axle in (a) a stowed condition on the motor vehicle and (b) a deployed condition at a location rearward of the motor vehicle chassis and then forcibly cause the auxiliary chassis to help support the motor vehicle chassis with the trailing axle, and
the auxiliary chassis suspension system includes a load-bearing member adapted to be engaged by the auxiliary chassis in the deployed condition at a location substantially closer to the trailing axle than the pivotal support of the auxiliary chassis for swinging movement about the first pivot axis and thereby bear a major portion of the force causing the auxiliary chassis to help support the motor vehicle chassis with the trailing axle.

2. A trailing axle suspension system as set forth in claim 1 wherein
the auxiliary chassis suspension system is adapted to apply the force acting on the auxiliary chassis in causing the auxiliary chassis to help support the motor vehicle chassis with the trailing axle.

3. A trailing axle suspension system as set forth in claim 1 wherein
the axle suspension system is adapted to apply the force acting on the auxiliary chassis in causing the auxiliary chassis to help support the motor vehicle chassis with the trailing axle.

4. A trailing axle suspension system as set forth in claim 1 wherein
the auxiliary chassis suspension system includes a pair of actuators adapted to apply the force acting on the auxiliary chassis in causing the auxiliary chassis to help support the motor vehicle chassis with the trailing axle.

5. A trailing axle suspension system as set forth in claim 1 wherein
the axle suspension system includes air springs adapted to apply the force acting on the auxiliary chassis in causing the auxiliary chassis to help support the motor vehicle chassis with the trailing axle.

6. A trailing axle suspension system as set forth in claim 1 wherein
the axle suspension system includes air springs adapted to deploy the trailing axle from the auxiliary chassis and then provide the force acting on the auxiliary chassis causing the auxiliary chassis to help support the motor vehicle chassis with the trailing axle.

7. A trailing axle suspension system as set forth in claim 1 wherein
the auxiliary chassis suspension system includes an actuator adapted to cause the engagement of the auxiliary chassis with the load-bearing member.

8. A trailing axle suspension system as set forth in claim 1 wherein
the auxiliary chassis suspension system includes a pair of actuators adapted to cause the engagement of the auxiliary chassis with the load-bearing member.

9. A trailing axle suspension system as set forth in claim 1 wherein
the auxiliary chassis suspension system includes a pair of hydraulically-operated actuators adapted to apply the force acting on the auxiliary chassis causing the auxiliary chassis to help support the motor vehicle chassis with the trailing axle.

10. A trailing axle suspension system as set forth in claim 1 wherein
the auxiliary chassis suspension system includes a pair of actuators and operably-associated gas springs adapted to provide the force acting on the auxiliary chassis causing the auxiliary chassis to help support the motor vehicle chassis with the trailing axle.

11. A trailing axle suspension system as set forth in claim 1 wherein
the axle suspension system includes a pair of air springs adapted to provide the force acting on the auxiliary chassis causing the auxiliary chassis to help support the motor vehicle chassis with the trailing axle.

12. A trailing axle suspension system as set forth in claim 1 wherein
the auxiliary chassis system includes a pair of suspension arms and a pair of actuators adapted to cooperatively suspend the auxiliary chassis from the motor vehicle chassis.

13. A trailing axle suspension system as set forth in claim 1 wherein
the auxiliary chassis suspension system is adapted to (a) apply the force acting on the auxiliary chassis causing the auxiliary chassis to help support the motor vehicle chassis with the trailing axle and (b) cushion road-induced movement of the auxiliary chassis toward and away from the motor vehicle chassis.

14. A trailing axle suspension system as set forth in claim 1 wherein
the auxiliary chassis suspension system includes a pair of hydraulically-operated actuators and operably-associated gas springs adapted to (a) apply the force acting on the auxiliary chassis causing the auxiliary chassis to help support the motor vehicle chassis with the trailing axle and (b) cushion road-induced movement of the auxiliary chassis toward and away from the motor vehicle chassis.

15. A trailing axle suspension system as set forth in claim 1 wherein
the load-bearing member acts through one or more elastomeric pads in engaging the auxiliary chassis.

16. A trailing axle suspension system as set forth in claim 1 wherein
the load-bearing member acts through one or more elastomeric pads fixed to the load-bearing member in engaging the auxiliary chassis.

17. A trailing axle suspension system as set forth in claim 1 wherein
the load-bearing member acts through one or more elastomeric pads fixed to the auxiliary chassis in engaging the auxiliary chassis.

18. A trailing axle suspension system as set forth in claim 1 wherein
the auxiliary chassis suspension system and axle suspension system are adapted to cooperatively establish the auxiliary chassis and trailing axle in the stowed condition at a location above the motor vehicle chassis.

19. A trailing axle suspension system as set forth in claim 1 wherein
the auxiliary chassis suspension system includes a pair of suspension arms that are (a) pivotally connected at one end to the motor vehicle chassis, (b) rigidly joined at their other end by the load-bearing member, and (c) pivotally support the auxiliary chassis at a location intermediate the ends of the suspension arms for swinging movement about the first pivot axis.

20. A trailing axle suspension system as set forth in claim 1 wherein
the auxiliary chassis suspension system includes a pair of suspension arms pivotally connected at one end to the motor vehicle chassis and rigidly joined at their other end by the load bearing member, and
a shaft rigidly joining the suspension arms pivotally supports the auxiliary chassis for swinging movement about the first pivot axis.

21. A trailing axle suspension system as set forth in claim 1 wherein
the axle suspension system is adapted to suspend the trailing axle from the auxiliary chassis for swinging movement about a trailing axle pivot axis midway of and perpendicular to the trailing axle, and
the auxiliary chassis suspension system is adapted to apply the force acting on the auxiliary chassis in causing the auxiliary chassis to help support the motor vehicle chassis with the trailing axle.

22. A trailing axle suspension system as set forth in claim 1 wherein
the axle suspension system is adapted to suspend the trailing axle for movement toward and away from the auxiliary chassis, and
the axle suspension system is adapted to apply the force acting on the auxiliary chassis in causing the auxiliary chassis to help support the motor vehicle chassis with the trailing axle.

23. A trailing axle suspension system as set forth in claim 1 wherein
the axle suspension system is adapted to suspend the trailing axle for movement toward and away from the auxiliary chassis, and
the axle suspension system includes air springs adapted to (a) apply the force acting on the auxiliary chassis in causing the auxiliary chassis to help support the motor vehicle chassis with the trailing axle and (b) cushion road-induced movement of the trailing axle toward and away from the auxiliary chassis.

24. A trailing axle suspension system as set forth in claim 1 wherein
the axle suspension system includes suspension arms adapted to suspend the trailing axle for movement toward and away from the auxiliary chassis, and
the axle suspension system includes air springs adapted to (a) cushion road-induced movement of the trailing axle toward and away from the auxiliary chassis and (b) apply the force acting on the auxiliary chassis causing the auxiliary chassis to help support the motor vehicle chassis with the trailing axle.

25. A trailing axle suspension system as set forth in claim 1 wherein
the auxiliary chassis suspension system includes a pair of suspension arms, and
the auxiliary suspension system and axle suspension system are adapted to cooperatively cause the tires of the trailing axle wheels to engage the suspension arms in establishing the auxiliary chassis and trailing axle in the stowed condition.

26. A trailing axle suspension system as set forth in claim 1 wherein
the auxiliary chassis suspension system includes a pair of suspension arms and an actuator, and
the actuator is adapted to (a) swing the auxiliary chassis in a direction causing the tires of the trailing axle wheels to engage the suspension arms in establishing the auxiliary chassis and trailing axle in the stowed condition and (b) swing the auxiliary chassis in a direction causing the auxiliary chassis to engage the load-bearing member in establishing the auxiliary chassis and trailing axle in the deployed condition.

27. A trailing axle suspension system as set forth in claim 1 wherein
the auxiliary chassis suspension system includes a pair of suspension arms rigidly joined by the load-bearing member, and
the auxiliary chassis is pivotally supported by the suspension arms from a member that is spaced from the load-bearing member and also rigidly joins the suspension arms.

28. A trailing axle suspension system as set forth in claim 1 wherein
the auxiliary chassis suspension system includes a pair of suspension arms and a pair of actuators adapted to cooperatively suspend the auxiliary chassis for movement toward and away from the motor vehicle chassis, and
the actuators are adapted to effect conjoint movement of the suspension arms and provide a resisting force acting on the auxiliary chassis enabling the axle suspension system to apply the force acting on the auxiliary chassis causing the auxiliary chassis to help support the motor vehicle chassis with the trailing axle.

29. A trailing axle suspension system as set forth in claim 1 wherein
the auxiliary chassis suspension system includes a pair of suspension arms and a pair of actuators adapted to cooperatively suspend the auxiliary chassis for movement toward and away from the motor vehicle chassis, and
the actuators are adapted to effect conjoint movement of the suspension arms and apply the force acting on the auxiliary chassis causing the auxiliary chassis to help support the motor vehicle chassis with the trailing axle.

30. A trailing axle suspension system as set forth in claim 1 wherein
the axle suspension system is adapted to suspend the trailing axle from the auxiliary chassis for swinging movement about a trailing axle pivot axis midway of and perpendicular to the trailing axle and located above the trailing axle when deployed in helping to support the motor vehicle chassis,
the axle suspension system includes a spring arrangement mounted between the trailing axle and the auxiliary chassis adapted to cushion road-induced swinging movement of the trailing axle, and the auxiliary chassis suspension system is adapted to apply the force acting on the auxiliary chassis in causing the auxiliary chassis to help support the motor vehicle chassis with the trailing axle.

31. A trailing axle suspension system as set forth in claim 1 wherein the axle suspension system is adapted to suspend the trailing axle from the auxiliary chassis for swinging movement about a trailing axle pivot axis midway of and perpendicular to the trailing axle, the axle suspension system includes air springs mounted on opposite sides of the trailing axle pivot axis between the trailing axle and auxiliary chassis adapted to cushion road-induced swinging movement of the trailing axle, and the auxiliary chassis suspension system is adapted to apply the force acting on the auxiliary chassis in causing the auxiliary chassis to help support the motor vehicle chassis with the trailing axle.

32. A trailing axle suspension system as set forth in claim 1 wherein the axle suspension system is adapted to suspend the trailing axle from the auxiliary chassis for swinging movement about a trailing axle pivot axis midway of and perpendicular to the trailing axle, the axle suspension system includes pairs of air springs mounted on opposite sides of the trailing axle pivot axis between the trailing axle and auxiliary chassis adapted to cushion road-induced swinging movement of the trailing axle, and the auxiliary chassis suspension system is adapted to applying the force acting on the auxiliary chassis causing the auxiliary chassis to help support the motor vehicle chassis with the trailing axle.

33. A trailing axle suspension system as set forth in claim 1 wherein the axle suspension system is adapted to suspend the trailing axle from the auxiliary chassis for swinging movement about a trailing axle pivot axis midway of and perpendicular to the trailing axle, the axle suspension system includes coil springs mounted on opposite sides of the trailing axle pivot axis between the trailing axle and auxiliary chassis adapted to cushion road-induced swinging movement of the trailing axle, and the auxiliary chassis suspension system is adapted to apply the force acting on the auxiliary chassis in causing the auxiliary chassis to help support the motor vehicle chassis with the trailing axle.

34. A trailing axle suspension system as set forth in claim 1 wherein the axle suspension system is adapted to suspend the trailing axle from the auxiliary chassis for swinging movement about a trailing axle pivot axis midway of and perpendicular to the trailing axle, the axle suspension system includes pairs of coil springs mounted on opposite sides of the trailing axle pivot axis between the trailing axle and auxiliary chassis adapted to cushion road-induced swinging movement of the trailing axle, and the auxiliary chassis suspension system is adapted to apply the force acting on the auxiliary chassis causing the auxiliary chassis to help support the motor vehicle chassis with the trailing axle.

35. A trailing axle suspension system as set forth in claim 1 wherein the axle suspension system is adapted to suspend the trailing axle from the auxiliary chassis for swinging movement about a trailing axle pivot axis midway of and perpendicular to the trailing axle, the axle suspension system includes springs mounted between the trailing axle and auxiliary chassis adapted to cushion road-induced swinging movement of the trailing axle, and the auxiliary chassis suspension system includes a pair of hydraulically-operated actuators adapted to apply the force acting on the auxiliary chassis causing the auxiliary chassis to help support the motor vehicle chassis with the trailing axle.

36. A trailing axle suspension system as set forth in claim 1 wherein the axle suspension system is adapted to suspend the trailing axle from the auxiliary chassis for swinging movement about a trailing axle pivot axis midway of and perpendicular to the trailing axle, the axle suspension system includes air springs adapted to cushion road-induced swinging movement of the trailing axle, and the auxiliary chassis suspension system includes a pair of hydraulically-operated actuators and operably-associated gas springs adapted to (a) apply the force acting on the auxiliary chassis causing the auxiliary chassis to help support the motor vehicle chassis with the trailing axle and (b) cushion road-induced movement of the auxiliary chassis toward and away from the motor vehicle chassis.

37. A trailing axle suspension system as set forth in claim 1 wherein the axle suspension system is adapted to suspend the trailing axle from the auxiliary chassis for swinging movement about a trailing axle pivot axis midway of and perpendicular to the trailing axle, the axle suspension system includes coil springs adapted to cushion road-induced swinging movement of the trailing axle, and the auxiliary chassis suspension system includes a pair of hydraulically-operated actuators and operably-associated gas springs adapted to (a) apply the force acting on the auxiliary chassis causing the auxiliary chassis to help support the motor vehicle chassis with the trailing axle and (b) cushion road-induced movement of the auxiliary chassis toward and away from the motor vehicle chassis.

38. A trailing axle suspension system as set forth in claim 1 wherein the axle suspension system is adapted to suspend the trailing axle for movement toward and away from the auxiliary chassis, the auxiliary chassis suspension system is adapted to apply the force acting on the auxiliary chassis in causing the auxiliary chassis to help support the motor vehicle chassis with the trailing axle, and the axle suspension system is adapted to apply the force acting on the auxiliary chassis in causing the auxiliary chassis to help support the motor vehicle chassis with the trailing axle instead of such being provided by the auxiliary chassis suspension system.

39. A trailing axle suspension system as set forth in claim 1 wherein
the axle suspension system includes suspension arms adapted to suspend the trailing axle for movement toward and away from the auxiliary chassis,
the axle suspension system includes air springs adapted to cushion road-induced movement of the trailing axle toward and away from the auxiliary chassis, and
the auxiliary chassis suspension system is adapted to apply the force acting on the auxiliary chassis causing the auxiliary chassis to help support the motor vehicle chassis with the trailing axle.

40. A trailing axle suspension system as set forth in claim 1 wherein
the axle suspension system includes suspension arms adapted to suspend the trailing axle for movement toward and away from the auxiliary chassis,
the axle suspension system includes actuators adapted to locate the trailing axle in a stowed location on the auxiliary chassis in establishing the auxiliary chassis and trailing axle in the stowed condition, and
the axle suspension system includes air springs adapted to deploy the trailing axle from the stowed location on the auxiliary chassis in establishing the auxiliary chassis and trailing axle in the deployed condition and then apply the force acting on the auxiliary chassis in causing the auxiliary chassis to help support the motor vehicle chassis with the trailing axle.

41. A trailing axle suspension system as set forth in claim 1 wherein
the axle suspension system includes suspension arms adapted to suspend the trailing axle for movement toward and away from the auxiliary chassis,
the axle suspension includes a pair of air springs adapted to provide the force acting on the auxiliary chassis causing the auxiliary chassis to help support the motor vehicle chassis with the trailing axle, and
the axle suspension system includes a pair of actuators adapted to stow the trailing axle with respect to the auxiliary chassis when not helping to support the motor vehicle chassis.

42. A trailing axle suspension system as set forth in claim 1 wherein
the auxiliary chassis suspension system includes a pair of suspension arms and a pair of hydraulically-operated actuators adapted to cooperatively suspend the auxiliary chassis from the motor vehicle chassis,
the hydraulically-operated actuators each have an operably-associated gas spring, and
the gas springs are adapted while the auxiliary chassis and trailing axle are in the deployed condition to allow certain limited swinging movement of the suspension arms forced by the trailing axle wheels traveling on a road surface at an elevation substantially different from that supporting the motor vehicle chassis.

43. A trailing axle suspension system as set forth in claim 1 wherein
the auxiliary chassis suspension system includes a pair of suspension arms and a pair of actuators adapted to cooperatively suspend the auxiliary chassis for movement toward and away from the motor vehicle chassis,
the actuators are adapted to effect conjoint movement of the suspension arms in establishing the stowed and deployed condition,
the actuators each have an operably-associated gas spring, and
the gas springs are adapted to cooperatively allow certain swinging movement of the suspension arms in the deployed condition allowing the tires of the trailing axle wheels to remain in contact with a road surface which the axle suspension system would otherwise not allow.

44. A trailing axle suspension system as set forth in claim 1 wherein
the motor vehicle chassis supports a load container, and
the auxiliary chassis suspension system and axle suspension system are adapted to cooperatively establish the auxiliary chassis and trailing axle in the stowed condition on the load container.

45. A trailing axle suspension system as set forth in claim 1 wherein
the motor vehicle chassis supports a load container, and
the auxiliary chassis suspension system is adapted to suspend the auxiliary chassis from the load container and thereby from the motor vehicle chassis.

46. A trailing axle suspension system as set forth in claim 1 wherein
the motor vehicle chassis supports a load container,
the auxiliary chassis suspension system is adapted to suspend the auxiliary chassis from the load container and thereby from the motor vehicle chassis, and
the auxiliary chassis suspension system and axle suspension system are adapted to cooperatively establish the auxiliary chassis and trailing axle in the stowed condition on the load container.

47. A trailing axle suspension system as set forth in claim 1 wherein
the motor vehicle chassis supports a tiltable load container, and
the auxiliary chassis suspension system and axle suspension system are adapted to cooperatively establish the auxiliary chassis and trailing axle in the stowed condition on the tiltable load container.

48. A trailing axle suspension system as set forth in claim 1 wherein
the motor vehicle chassis supports a tiltable load container, and
the auxiliary chassis suspension system is adapted to suspend the auxiliary chassis from the tiltable load container and thereby from the motor vehicle chassis.

49. A trailing axle suspension system as set forth in claim 1 wherein
the motor vehicle chassis supports a tiltable load container,
the auxiliary chassis suspension system is adapted to suspend the auxiliary chassis from the tiltable load container and thereby from the motor vehicle chassis, and
the auxiliary chassis suspension system and axle suspension system are adapted to cooperatively establish the auxiliary chassis and trailing axle in the stowed condition on the tiltable load container.

50. A trailing axle suspension system as set forth in claim 1 wherein
the axle suspension system includes an air spring arrangement adapted to cushion road-induced trailing axle movement toward and way from the auxiliary chassis.

51. A trailing axle suspension system as set forth in claim 1 wherein
the axle suspension system includes a coil spring arrangement adapted to cushion road-induced trailing axle movement toward and way from the auxiliary chassis.

* * * * *